(12) United States Patent
Lyons et al.

(10) Patent No.: US 9,454,587 B2
(45) Date of Patent: Sep. 27, 2016

(54) SEARCHING AND RESTORING OF BACKUPS

(71) Applicant: Apple Inc., Cupertino, CA (US)

(72) Inventors: David Lyons, San Jose, CA (US); Eric Weiss, San Francisco, CA (US); Pavel Cisler, Los Gatos, CA (US); Peter McInerney, Cupertino, CA (US); John Hornkvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/468,165

(22) Filed: Aug. 25, 2014

(65) Prior Publication Data

US 2014/0365479 A1 Dec. 11, 2014

Related U.S. Application Data

(63) Continuation of application No. 11/760,588, filed on Jun. 8, 2007, now abandoned.

(51) Int. Cl.
*G06F 17/30* (2006.01)
*G06F 11/14* (2006.01)
*G06F 3/0482* (2013.01)

(52) U.S. Cl.
CPC ....... *G06F 17/30554* (2013.01); *G06F 3/0482* (2013.01); *G06F 11/1458* (2013.01); *G06F 11/1469* (2013.01); *G06F 2201/84* (2013.01)

(58) Field of Classification Search
CPC ................................................ G06F 17/30554
See application file for complete search history.

(56) References Cited

U.S. PATENT DOCUMENTS

| | | |
|---|---|---|
| 5,150,407 A | 9/1992 | Chan |
| 5,150,473 A | 9/1992 | Zulch |
| 5,163,148 A | 11/1992 | Walls |
| 5,276,867 A | 1/1994 | Kenley et al. |
| 5,349,658 A | 9/1994 | O'Rourke et al. |
| 5,369,570 A | 11/1994 | Parad |
| 5,574,846 A | 11/1996 | Yoshimura et al. |
| 5,659,614 A | 8/1997 | Bailey |

(Continued)

FOREIGN PATENT DOCUMENTS

| | | |
|---|---|---|
| EP | 629950 | 12/1997 |
| EP | 1152352 | 11/2001 |

(Continued)

OTHER PUBLICATIONS

Office Action dated Apr. 1, 2015 from related Chinese Application No. 201310073409.1, 13 pages.

(Continued)

*Primary Examiner* — Syed Hasan
(74) *Attorney, Agent, or Firm* — Fish & Richardson P.C.

(57) ABSTRACT

Methods, systems, and apparatus, including computer program products, for searching for and presenting backups. A first search result including a first version of an item is presented. The first version is associated with a first date range having a first start date and a first end date. User input requesting that an archive including one or more versions of the item be searched is received. A second search result including a second version of the item is presented. The second version is different from the first version. The second version is associated with a second date range having a second start date and a second end date. The second date range does not overlap with the first date range.

30 Claims, 13 Drawing Sheets

(56) References Cited

U.S. PATENT DOCUMENTS

| | | |
|---|---|---|
| 5,664,186 A | 9/1997 | Bennett et al. |
| 5,680,562 A | 10/1997 | Conrad et al. |
| 5,736,974 A | 4/1998 | Selker |
| 5,745,669 A | 4/1998 | Hugard et al. |
| 5,754,178 A | 5/1998 | Johnston et al. |
| 5,758,359 A | 5/1998 | Saxon |
| 5,790,120 A | 8/1998 | Lozares et al. |
| 5,802,175 A | 9/1998 | Kara |
| 5,818,936 A | 10/1998 | Mashayekhi |
| 5,819,032 A | 10/1998 | De Vries et al. |
| 5,819,292 A | 10/1998 | Hitz et al. |
| 5,831,617 A | 11/1998 | Bhukhanwala |
| 5,832,526 A | 11/1998 | Schuyler |
| 5,961,605 A | 10/1999 | Deng et al. |
| 5,987,566 A | 11/1999 | Vishlitzky et al. |
| 6,006,227 A | 12/1999 | Freeman et al. |
| 6,023,506 A | 2/2000 | Ote et al. |
| 6,054,989 A | 4/2000 | Robertson et al. |
| 6,097,313 A | 8/2000 | Takahashi et al. |
| 6,112,318 A | 8/2000 | Jouppi et al. |
| 6,121,969 A | 9/2000 | Jain et al. |
| 6,134,660 A | 10/2000 | Boneh et al. |
| 6,167,532 A | 12/2000 | Wisecup |
| 6,188,405 B1 | 2/2001 | Czerwinski et al. |
| 6,269,381 B1 | 7/2001 | St. Pierre et al. |
| 6,366,988 B1 | 4/2002 | Skiba et al. |
| 6,396,500 B1 | 5/2002 | Qureshi et al. |
| 6,397,308 B1 | 5/2002 | Ofek et al. |
| 6,424,626 B1 | 7/2002 | Kidambi et al. |
| 6,460,055 B1 | 10/2002 | Midgley et al. |
| 6,493,745 B1 | 12/2002 | Cherian |
| 6,553,392 B1 | 4/2003 | Mosher, Jr. et al. |
| 6,574,733 B1 | 6/2003 | Langford |
| 6,600,501 B1 | 7/2003 | Israel et al. |
| 6,604,118 B2 | 8/2003 | Kleiman et al. |
| 6,625,704 B2 | 9/2003 | Winokur |
| 6,629,129 B1 | 9/2003 | Bookspan et al. |
| 6,636,937 B2 | 10/2003 | Peter |
| 6,638,313 B1 | 10/2003 | Freeman et al. |
| 6,701,454 B1 | 3/2004 | Fischer et al. |
| 6,711,572 B2 | 3/2004 | Zakharov et al. |
| 6,714,201 B1 | 3/2004 | Grinstein et al. |
| 6,714,952 B2 | 3/2004 | Dunham et al. |
| 6,724,918 B1 | 4/2004 | Yen et al. |
| 6,725,427 B2 | 4/2004 | Freeman et al. |
| 6,728,735 B1 | 4/2004 | Fong |
| 6,750,890 B1 | 6/2004 | Sugimoto |
| 6,760,723 B2 | 7/2004 | Oshinsky et al. |
| 6,768,999 B2 | 7/2004 | Prager et al. |
| 6,785,751 B1 | 8/2004 | Connor |
| 6,785,786 B1 | 8/2004 | Gold et al. |
| 6,801,229 B1 | 10/2004 | Tinkler |
| 6,836,657 B2 | 12/2004 | Ji et al. |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 | 7/2005 | Novik et al. |
| 6,947,556 B1 | 9/2005 | Matyas et al. |
| 6,948,039 B2 | 9/2005 | Biessener et al. |
| 6,959,368 B1 | 10/2005 | St. Pierre et al. |
| 6,993,710 B1 | 1/2006 | Coad et al. |
| 7,069,402 B2 | 6/2006 | Coulter et al. |
| 7,072,916 B1 | 7/2006 | Lewis et al. |
| 7,099,900 B1 | 8/2006 | Bromley et al. |
| 7,103,740 B1 | 9/2006 | Colgrove et al. |
| 7,107,527 B2 | 9/2006 | Takahashi et al. |
| 7,111,136 B2 | 9/2006 | Yamagami |
| 7,133,902 B2 | 11/2006 | Saha et al. |
| 7,134,026 B2 | 11/2006 | Horiuchi et al. |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,213,040 B1 | 5/2007 | Stokes |
| 7,222,194 B2 | 5/2007 | Kano et al. |
| 7,257,717 B2 | 8/2007 | Huang |
| 7,275,075 B2 | 9/2007 | Cannon |
| 7,284,190 B2 | 10/2007 | Chellis et al. |
| 7,289,973 B2 | 10/2007 | Kiessig et al. |
| 7,318,134 B1 | 1/2008 | Oliveira et al. |
| 7,320,076 B2 | 1/2008 | Caronni |
| 7,386,801 B1 | 6/2008 | Horvitz et al. |
| 7,401,194 B2 | 7/2008 | Jewell |
| 7,418,619 B1 | 8/2008 | Uhlmann et al. |
| 7,434,164 B2 | 10/2008 | Salesin et al. |
| 7,434,177 B1 | 10/2008 | Ording et al. |
| 7,440,125 B2 | 10/2008 | Maekawa et al. |
| 7,483,693 B2 | 1/2009 | Lueng et al. |
| 7,505,762 B2 | 3/2009 | Onyon et al. |
| 7,518,611 B2 | 4/2009 | Boyd et al. |
| 7,558,930 B2 | 7/2009 | Kitamura et al. |
| 7,559,016 B1 | 7/2009 | Rakowski et al. |
| 7,574,459 B2 | 8/2009 | Sen et al. |
| 7,590,668 B2 | 9/2009 | Kathuria et al. |
| 7,596,586 B2 | 9/2009 | Gokhale et al. |
| 7,600,133 B2 | 10/2009 | Long et al. |
| 7,620,670 B2 | 11/2009 | Tokuda et al. |
| 7,624,133 B1 | 11/2009 | Ojalvo |
| 7,630,021 B2 | 12/2009 | Matsuzaka et al. |
| 7,657,450 B2 | 2/2010 | Amit et al. |
| 7,660,817 B2 | 2/2010 | Smith et al. |
| 7,669,141 B1 | 2/2010 | Pegg |
| 7,676,689 B1 | 3/2010 | Shioyama et al. |
| 7,703,044 B2 | 4/2010 | Graham |
| 7,711,771 B2 | 5/2010 | Kirnos |
| 7,716,171 B2 | 5/2010 | Kryger |
| 7,734,594 B2 | 6/2010 | Wang |
| 7,735,018 B2 | 6/2010 | Bakhash |
| 7,739,464 B1 | 6/2010 | Coulter et al. |
| 7,739,622 B2 | 6/2010 | DeLine et al. |
| 7,743,347 B2 | 6/2010 | Graham et al. |
| 7,747,655 B2 | 6/2010 | Hull et al. |
| 7,752,573 B2 | 7/2010 | Shiba et al. |
| 7,761,456 B1 | 7/2010 | Cram et al. |
| 7,774,718 B2 | 8/2010 | Finke-Anlauff et al. |
| 7,788,080 B2 | 8/2010 | Graham et al. |
| 7,788,592 B2 | 8/2010 | Williams et al. |
| 7,800,615 B2 | 9/2010 | MacPherson |
| 7,809,687 B2 | 10/2010 | Cisler et al. |
| 7,809,688 B2 | 10/2010 | Cisler et al. |
| 7,836,311 B2 | 11/2010 | Kuriya et al. |
| 7,853,566 B2 | 12/2010 | Cisler et al. |
| 7,853,567 B2 | 12/2010 | Cisler et al. |
| 7,856,424 B2 | 12/2010 | Cisler et al. |
| 7,860,839 B2 | 12/2010 | Cisler et al. |
| 7,882,072 B1 | 2/2011 | Axe et al. |
| 7,890,527 B1 | 2/2011 | Nene et al. |
| 7,899,829 B1 | 3/2011 | Malla |
| 7,934,064 B1 | 4/2011 | Per et al. |
| 7,953,730 B1 * | 5/2011 | Bleckner ............ G06F 17/30864 707/722 |
| 7,974,948 B2 | 7/2011 | Baer et al. |
| 7,999,810 B1 | 8/2011 | Boice et al. |
| 8,010,900 B2 | 8/2011 | Hart et al. |
| 8,024,292 B2 | 9/2011 | Thompson et al. |
| 8,055,911 B2 | 11/2011 | Feng et al. |
| 8,099,392 B2 | 1/2012 | Paterson et al. |
| 8,161,410 B2 | 4/2012 | Bray |
| 8,166,415 B2 | 4/2012 | Cisler et al. |
| 8,209,308 B2 | 6/2012 | Rueben et al. |
| 8,219,995 B2 | 7/2012 | Flemming et al. |
| 8,229,897 B2 | 7/2012 | Cannon et al. |
| 8,234,591 B1 | 7/2012 | Dhawan et al. |
| 8,245,078 B1 | 8/2012 | Chatterjee et al. |
| 8,260,770 B2 | 9/2012 | Bell et al. |
| 8,307,004 B2 | 11/2012 | Weiss et al. |
| 8,311,988 B2 | 11/2012 | Cisler et al. |
| 8,352,702 B2 | 1/2013 | O'Neill et al. |
| 8,370,853 B2 | 2/2013 | Giampaolo et al. |
| 8,375,318 B2 | 2/2013 | Masuda et al. |
| 8,468,136 B2 | 6/2013 | Ulrich et al. |
| 8,495,024 B2 | 7/2013 | Cisler et al. |
| 8,504,516 B2 | 8/2013 | Weiss et al. |
| 8,504,527 B2 | 8/2013 | Cisler et al. |

(56) References Cited

U.S. PATENT DOCUMENTS

| | | | |
|---|---|---|---|
| 8,566,289 B2 | 10/2013 | Paterson et al. | |
| 8,627,195 B1* | 1/2014 | Hayden | G06F 17/30873 |
| | | | 715/229 |
| 8,725,965 B2 | 5/2014 | Hart et al. | |
| 8,745,523 B2 | 6/2014 | McInerney et al. | |
| 8,775,378 B2 | 7/2014 | Cisler et al. | |
| 8,839,087 B1* | 9/2014 | Hayden | G06F 17/30412 |
| | | | 715/204 |
| 9,009,115 B2 | 4/2015 | Cisler et al. | |
| 2001/0047368 A1 | 11/2001 | Oshinsky et al. | |
| 2001/0055317 A1 | 12/2001 | Kajizaki et al. | |
| 2002/0016912 A1 | 2/2002 | Johnson | |
| 2002/0023198 A1 | 2/2002 | Kokubun et al. | |
| 2002/0046220 A1 | 4/2002 | Freeman et al. | |
| 2002/0049883 A1 | 4/2002 | Schneider et al. | |
| 2002/0054158 A1 | 5/2002 | Asami | |
| 2002/0063737 A1 | 5/2002 | Feig et al. | |
| 2002/0065999 A1 | 5/2002 | Kikuchi et al. | |
| 2002/0075322 A1 | 6/2002 | Rosenzweig et al. | |
| 2002/0080180 A1 | 6/2002 | Mander et al. | |
| 2002/0107886 A1 | 8/2002 | Gentner et al. | |
| 2002/0112237 A1 | 8/2002 | Kelts | |
| 2002/0120648 A1 | 8/2002 | Ball et al. | |
| 2002/0156921 A1 | 10/2002 | Dutta et al. | |
| 2002/0160760 A1 | 10/2002 | Aoyama | |
| 2002/0174283 A1 | 11/2002 | Lin | |
| 2003/0014521 A1 | 1/2003 | Elson et al. | |
| 2003/0016248 A1 | 1/2003 | Hayes Ubillos | |
| 2003/0018878 A1 | 1/2003 | Dorward et al. | |
| 2003/0038831 A1 | 2/2003 | Engelfriet | |
| 2003/0050940 A1 | 3/2003 | Robinson | |
| 2003/0063128 A1 | 4/2003 | Salmimaa et al. | |
| 2003/0065687 A1 | 4/2003 | Momiji et al. | |
| 2003/0097640 A1 | 5/2003 | Abrams et al. | |
| 2003/0122874 A1 | 7/2003 | Dieberger et al. | |
| 2003/0126247 A1 | 7/2003 | Strasser et al. | |
| 2003/0131007 A1 | 7/2003 | Schirmer et al. | |
| 2003/0135650 A1 | 7/2003 | Kano et al. | |
| 2003/0137540 A1 | 7/2003 | Klevenz et al. | |
| 2003/0167380 A1 | 9/2003 | Green | |
| 2003/0172937 A1 | 9/2003 | Faries et al. | |
| 2003/0177149 A1 | 9/2003 | Coombs | |
| 2003/0182332 A1 | 9/2003 | McBrearty et al. | |
| 2003/0195903 A1 | 10/2003 | Manley et al. | |
| 2003/0220949 A1 | 11/2003 | Witt et al. | |
| 2004/0003351 A1 | 1/2004 | Sommerer et al. | |
| 2004/0044707 A1 | 3/2004 | Richard | |
| 2004/0066414 A1 | 4/2004 | Czerwinski et al. | |
| 2004/0073560 A1 | 4/2004 | Edwards | |
| 2004/0078641 A1 | 4/2004 | Fleischmann | |
| 2004/0088331 A1 | 5/2004 | Therrien et al. | |
| 2004/0117459 A1 | 6/2004 | Fry | |
| 2004/0125137 A1 | 7/2004 | Stata et al. | |
| 2004/0125150 A1 | 7/2004 | Adcock et al. | |
| 2004/0133575 A1 | 7/2004 | Farmer et al. | |
| 2004/0139396 A1 | 7/2004 | Gelernter et al. | |
| 2004/0143652 A1 | 7/2004 | Grannan et al. | |
| 2004/0153973 A1 | 8/2004 | Horwitz | |
| 2004/0163009 A1 | 8/2004 | Goldstein et al. | |
| 2004/0167942 A1 | 8/2004 | Oshinsky et al. | |
| 2004/0175000 A1 | 9/2004 | Caronni | |
| 2004/0193953 A1 | 9/2004 | Callahan et al. | |
| 2004/0199779 A1 | 10/2004 | Huang | |
| 2004/0199826 A1 | 10/2004 | Bertram et al. | |
| 2004/0210608 A1 | 10/2004 | Lee et al. | |
| 2004/0220965 A1 | 11/2004 | Harville et al. | |
| 2004/0220980 A1 | 11/2004 | Forster | |
| 2004/0222992 A1 | 11/2004 | Calkins et al. | |
| 2004/0228493 A1 | 11/2004 | Ma | |
| 2004/0230892 A1 | 11/2004 | Horton | |
| 2004/0235523 A1 | 11/2004 | Schrire et al. | |
| 2004/0236769 A1 | 11/2004 | Smith et al. | |
| 2004/0236916 A1 | 11/2004 | Berkowitz et al. | |
| 2004/0236958 A1 | 11/2004 | Teicher et al. | |
| 2004/0267700 A1 | 12/2004 | Dumais et al. | |
| 2005/0010955 A1 | 1/2005 | Elia et al. | |
| 2005/0047295 A1 | 3/2005 | Kim et al. | |
| 2005/0071390 A1 | 3/2005 | Midgley et al. | |
| 2005/0086613 A1 | 4/2005 | McKnight et al. | |
| 2005/0091596 A1 | 4/2005 | Anthony et al. | |
| 2005/0097475 A1 | 5/2005 | Makioka et al. | |
| 2005/0102329 A1 | 5/2005 | Jiang et al. | |
| 2005/0102695 A1 | 5/2005 | Musser | |
| 2005/0108253 A1 | 5/2005 | Metsatahti et al. | |
| 2005/0138013 A1 | 6/2005 | Walker et al. | |
| 2005/0138066 A1 | 6/2005 | Finke-Anlauff et al. | |
| 2005/0138081 A1 | 6/2005 | Alshab et al. | |
| 2005/0144135 A1 | 6/2005 | Juarez et al. | |
| 2005/0149577 A1 | 7/2005 | Okada et al. | |
| 2005/0165867 A1 | 7/2005 | Barton et al. | |
| 2005/0187992 A1 | 8/2005 | Prahlad et al. | |
| 2005/0204186 A1 | 9/2005 | Rothman et al. | |
| 2005/0216520 A1 | 9/2005 | He et al. | |
| 2005/0216527 A1 | 9/2005 | Erlingsson | |
| 2005/0246398 A1 | 11/2005 | Barzilai et al. | |
| 2005/0262168 A1 | 11/2005 | Helliker et al. | |
| 2005/0262377 A1 | 11/2005 | Sim-Tang | |
| 2006/0026218 A1 | 2/2006 | Urmston | |
| 2006/0036568 A1 | 2/2006 | Moore et al. | |
| 2006/0041603 A1 | 2/2006 | Paterson et al. | |
| 2006/0041823 A1 | 2/2006 | Wolfgang et al. | |
| 2006/0053332 A1 | 3/2006 | Uhlmann | |
| 2006/0064444 A1 | 3/2006 | Van Ingen et al. | |
| 2006/0064634 A1 | 3/2006 | Dettinger et al. | |
| 2006/0080521 A1 | 4/2006 | Barr et al. | |
| 2006/0085792 A1 | 4/2006 | Traut | |
| 2006/0085817 A1 | 4/2006 | Kim et al. | |
| 2006/0088167 A1 | 4/2006 | Bade et al. | |
| 2006/0101384 A1 | 5/2006 | Sim-Tang et al. | |
| 2006/0106893 A1 | 5/2006 | Daniels et al. | |
| 2006/0117022 A1 | 6/2006 | Lucas | |
| 2006/0117309 A1 | 6/2006 | Singhal et al. | |
| 2006/0129496 A1 | 6/2006 | Chow et al. | |
| 2006/0137010 A1 | 6/2006 | Kramer et al. | |
| 2006/0143250 A1 | 6/2006 | Peterson et al. | |
| 2006/0150107 A1 | 7/2006 | Leung et al. | |
| 2006/0156246 A1 | 7/2006 | Williams et al. | |
| 2006/0156259 A1 | 7/2006 | Wagner et al. | |
| 2006/0161861 A1 | 7/2006 | Holecek et al. | |
| 2006/0173848 A1 | 8/2006 | Peterson et al. | |
| 2006/0200754 A1 | 9/2006 | Kablesh et al. | |
| 2006/0206460 A1* | 9/2006 | Gadkari | G06F 17/30867 |
| 2006/0218363 A1 | 9/2006 | Palapudi | |
| 2006/0224956 A1 | 10/2006 | Storisteanu et al. | |
| 2006/0235907 A1 | 10/2006 | Kathuria et al. | |
| 2006/0236406 A1 | 10/2006 | Johnson | |
| 2006/0248294 A1 | 11/2006 | Nedved et al. | |
| 2006/0253470 A1 | 11/2006 | Friedman et al. | |
| 2006/0288205 A1 | 12/2006 | Linares | |
| 2007/0015118 A1 | 1/2007 | Nickell et al. | |
| 2007/0027935 A1 | 2/2007 | Haselton et al. | |
| 2007/0030528 A1 | 2/2007 | Quaeler et al. | |
| 2007/0038884 A1 | 2/2007 | Campbell et al. | |
| 2007/0043715 A1 | 2/2007 | Kaushik et al. | |
| 2007/0043790 A1 | 2/2007 | Kryger | |
| 2007/0070066 A1 | 3/2007 | Bakhash | |
| 2007/0078910 A1 | 4/2007 | Bopardikar | |
| 2007/0088702 A1 | 4/2007 | Fridella et al. | |
| 2007/0094312 A1 | 4/2007 | Sim-Tang | |
| 2007/0106978 A1 | 5/2007 | Felts | |
| 2007/0130232 A1 | 6/2007 | Therrien et al. | |
| 2007/0136381 A1 | 6/2007 | Cannon et al. | |
| 2007/0136389 A1 | 6/2007 | Bergant et al. | |
| 2007/0136423 A1 | 6/2007 | Gilmore et al. | |
| 2007/0143425 A1 | 6/2007 | Kieselbach et al. | |
| 2007/0150326 A1 | 6/2007 | Nakao et al. | |
| 2007/0156772 A1 | 7/2007 | Lechner | |
| 2007/0168497 A1 | 7/2007 | Locker et al. | |
| 2007/0174580 A1 | 7/2007 | Shulga | |
| 2007/0180268 A1 | 8/2007 | Filimon et al. | |
| 2007/0185879 A1 | 8/2007 | Roublev et al. | |
| 2007/0185922 A1 | 8/2007 | Kapoor et al. | |
| 2007/0186127 A1 | 8/2007 | Desai et al. | |
| 2007/0192386 A1 | 8/2007 | Fries et al. | |

(56) References Cited

U.S. PATENT DOCUMENTS

| | | |
|---|---|---|
| 2007/0245238 A1 | 10/2007 | Fugitt et al. |
| 2007/0266007 A1 | 11/2007 | Arrouye et al. |
| 2007/0271263 A1* | 11/2007 | Merrild |
| 2007/0271303 A1 | 11/2007 | Menendez et al. |
| 2007/0282854 A1 | 12/2007 | Bhogal et al. |
| 2007/0288536 A1 | 12/2007 | Sen et al. |
| 2008/0016576 A1 | 1/2008 | Ueda et al. |
| 2008/0022393 A1 | 1/2008 | Waltermann et al. |
| 2008/0028007 A1 | 1/2008 | Ishii et al. |
| 2008/0033969 A1 | 2/2008 | Koo et al. |
| 2008/0034004 A1 | 2/2008 | Cisler et al. |
| 2008/0034011 A1 | 2/2008 | Cisler et al. |
| 2008/0034017 A1 | 2/2008 | Giampaolo et al. |
| 2008/0034019 A1 | 2/2008 | Cisler et al. |
| 2008/0046557 A1 | 2/2008 | Cheng |
| 2008/0065663 A1 | 3/2008 | Farlee et al. |
| 2008/0070496 A1 | 3/2008 | Jackson |
| 2008/0071796 A1* | 3/2008 | Ghuneim .......... G06F 17/30554 |
| 2008/0077808 A1 | 3/2008 | Teicher et al. |
| 2008/0082578 A1 | 4/2008 | Hogue et al. |
| 2008/0091655 A1 | 4/2008 | Gokhale et al. |
| 2008/0126442 A1 | 5/2008 | Cisler et al. |
| 2008/0133487 A1* | 6/2008 | Gross ................ G06F 17/30864 |
| 2008/0141029 A1 | 6/2008 | Culver |
| 2008/0162999 A1 | 7/2008 | Schlueter et al. |
| 2008/0168184 A1 | 7/2008 | Freedman et al. |
| 2008/0168245 A1 | 7/2008 | De Atley et al. |
| 2008/0168391 A1 | 7/2008 | Robbin et al. |
| 2008/0172428 A1 | 7/2008 | Stokes |
| 2008/0172607 A1 | 7/2008 | Baer |
| 2008/0177961 A1 | 7/2008 | McSharry et al. |
| 2008/0208630 A1 | 8/2008 | Fors et al. |
| 2008/0214163 A1 | 9/2008 | Onyon et al. |
| 2008/0216011 A1 | 9/2008 | Gould |
| 2008/0222512 A1 | 9/2008 | Albornoz et al. |
| 2008/0229037 A1 | 9/2008 | Bunte et al. |
| 2008/0250314 A1 | 10/2008 | Larsen |
| 2008/0250342 A1 | 10/2008 | Clark et al. |
| 2008/0250400 A1 | 10/2008 | Vertes |
| 2008/0256138 A1 | 10/2008 | Sim-Tang |
| 2008/0285754 A1 | 11/2008 | Kezmann |
| 2008/0307017 A1 | 12/2008 | Lyons et al. |
| 2008/0307020 A1 | 12/2008 | Ko et al. |
| 2008/0307347 A1 | 12/2008 | Cisler et al. |
| 2008/0310628 A1 | 12/2008 | Fujioka et al. |
| 2008/0310633 A1 | 12/2008 | Brown et al. |
| 2008/0313243 A1 | 12/2008 | Poston et al. |
| 2009/0019291 A1 | 1/2009 | Murray |
| 2009/0031401 A1 | 1/2009 | Cudich et al. |
| 2009/0052669 A1 | 2/2009 | Ma |
| 2009/0116641 A1 | 5/2009 | Bokor et al. |
| 2009/0307333 A1 | 12/2009 | Welingkar et al. |
| 2010/0017855 A1 | 1/2010 | Johnson et al. |
| 2010/0063960 A1 | 3/2010 | Lehto |
| 2010/0070844 A1 | 3/2010 | Aymeloglu et al. |
| 2010/0169823 A1 | 7/2010 | Audet |
| 2010/0205397 A1 | 8/2010 | Chellam |
| 2010/0217929 A1 | 8/2010 | Kirshenbaum et al. |
| 2011/0016089 A1 | 1/2011 | Freedman et al. |
| 2011/0185762 A1 | 1/2011 | Freedman et al. |
| 2011/0083098 A1 | 4/2011 | Cisler et al. |
| 2011/0202763 A1 | 8/2011 | Martin et al. |
| 2011/0296351 A1 | 12/2011 | Ewing et al. |
| 2011/0302502 A1 | 12/2011 | Hart et al. |
| 2012/0185438 A1 | 7/2012 | Giampaolo et al. |
| 2012/0185518 A1 | 7/2012 | Giampaolo et al. |
| 2012/0185762 A1 | 7/2012 | Ozer et al. |
| 2012/0185767 A1 | 7/2012 | Schlegel |
| 2012/0198383 A1 | 8/2012 | Cisler et al. |
| 2012/0246565 A1 | 9/2012 | Kumamoto |
| 2012/0272173 A1 | 10/2012 | Grossman et al. |
| 2013/0066836 A1 | 3/2013 | Weiss et al. |
| 2013/0073821 A1 | 3/2013 | Flynn et al. |
| 2013/0212599 A1 | 8/2013 | Giampaolo et al. |

FOREIGN PATENT DOCUMENTS

| | | |
|---|---|---|
| EP | 1582982 | 10/2005 |
| WO | WO 01/06356 | 1/2001 |
| WO | WO 02/101540 | 12/2002 |
| WO | WO 2005/045756 | 5/2005 |
| WO | WO 2008/019237 | 2/2008 |
| WO | WO 2008/019259 | 2/2008 |

OTHER PUBLICATIONS

"Apple Previews Mac OS X Leopard," Aug. 7, 2006, [Online] [Retrieved on Nov. 26, 2007] Retrieved from the Internet: URL:http://www.apple.com/pr/library/2006/aug/07leopard.html, pp. 1-2.

"Aulaclic: Unit 6. The Recycle Bin," Nov. 2005, [Online] [Retrieved on Nov. 26, 2007] Retrieved from the Internet: URL:http://www.teacherclick.com/winxp/t_6_1.htm, pp. 1-2.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

"MSDN Academic Alliance Developer Center, Curriculum Repository Glossary," [Online] [Retrieved on Apr. 22, 2009] Retrieved from the Internet URL: http://www.academicresourcecenter.net/curriculum/glossary.aspx, 4 pages.

"StorageSync: Backup, Restore, & Synchronization Software User's Guide", SimpleTech, 2003, 100 pages.

"What's New in Word 2002," Wellesly College Information Services Computing Documentation, Jan. 2002, [Online] Retrieved on Aug. 14, 2008] Retrieved from the Internet URL: http://www.wellesley.edu/Computing/Office02/Word02/word02.html, 19 pages.

Bonwick et al., "The Zettabyte File System," [Online] [Retrieved on Jan. 22, 2008] Retrieved from the Internet: URL:http://partneradvantage.sun.com/protected/solaris10/adoptionkit/tech/zfs/zfs_overview.pdf, 13 pages.

Bonwick, "ZFS The Last Word in File Systems," [Online] [Retrieved on Jan. 22, 2008] Retrieved from the Internet: URL:http://opensolaris.org/os/community/zfs/docs/zfs.pdf, 34 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Charles Rubin, Mary Millhollon and Katherine Murray, "Microsoft Office Word 2003, Official Manual", First Edition, Japan, Nikkei BP Softpress, Jul. 12, 2004, vol. 1, p. 300, 815-818.

Chen et al., "Data Redundancy and Compression Methods for a Disk-based Network Backup System", 2004, IEEE, pp. 1-8.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

European, Communication pursuant to Article 94(3) EPC for Application No. EP 07 813 540.7, dated Jun. 23, 2009, 2 pages.

European Extended European Search Report and Written Opinion, European Application No. 11171738.5, Aug. 29, 2011, 5 pages.

European, Communication pursuant to Article 94(3) EPC for Application No. EP 07 799 899.5, dated May 14, 2009, 2 pages.

European, Communication pursuant to Article 94(3) EPC for Application No. EP 07 799 899.5, dated Oct. 7, 2009, 4 pages.

Examination Report from European Application No. 07 813 540.7 dated Oct. 27, 2011, 5 pages.

Examination Report from European Application No. 07 813 605.8 dated Oct. 27, 2011, 5 pages.

Extended European Search Report, European Application No. 11184579.8, Nov. 17, 2011, 6 pages.

Godfrey, Michael et al., "Using Original Analysis to Detect Merging and Splitting of Source Code Entities," IEEE Transactions on Software Engineering, vol. 31, No. 2. Feb. 2005. pp. 166-181.

(56) References Cited

OTHER PUBLICATIONS

Griffiths, "Leopard first looks: Time Machine," Aug. 8, 2006 [Online] [Retrieved on Nov. 23, 2007] Retrieved from the Internet: URL:http://www.macworld.com/2006/08/firstlooks/leotimemac/index.php?pf=1, pp. 1-2.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

In-link files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/In.html, 5 pages.

International Search Report and Written Opinion, PCT/US2007/074653, Aug. 14, 2008, 14 pages.

International Search Report and Written Opinion, PCT/US2007/074729, Jul. 12, 2007, 11 pages.

International Search Report and Written Opinion, PCT/US2007/074863 Apr. 21, 2009, 20 pages.

International Search Report and Written Opinion, PCT/US2007/074881, Jul. 12, 2007, 11 pages.

International Search Report and Written Opinion, PCT/US2008/065146, Oct. 31, 2008, 21 pages.

International Search Report and Written Opinion, PCT/US2008/066212, Mar. 9, 2009, 26 pages.

Microsoft Corporation, "Description of the AutoRecover Functions in Excel," [online] Microsoft Corporation, Aug. 10, 2007, Article ID 289273; URL: http://support.microsoft.com/kb/289273/en-us.

Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2. (OA May 26, 2014).

Microsoft-TechNet, "Using Encrypting File System," Nov. 3, 2005, Microsoft, 40 pages.

Moorthy, "Linux Crontab: 15 Awesome Cron Job Examples," TheGeekStuff.com, Jun. 11, 2009, retrieved on Dec. 23, 2013, http://www.thegeekstuff.com/2009/06/15-practical-crontab-examples/, 6 pages.

Office Action dated Feb. 29, 2012 from related Chinese Application No. 200880024710.0, 11 pages.

Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.

Shi et al., "USP: A Lightweight File System Management Framework," 2010 Fifth IEEE International Conference on Networking, Architecture, and Storage, 2010 IEEE, pp. 250-256.

Sun Microsystems, Inc., "ZFS On-Disk Specification," Draft: Dec. 9, 2005, [Online] [Retrieved on Jan. 22, 2008]; Retrieved from the Internet URL: http://opensolaris.org/os/community/zfs/docs/ondiskformat0822.pdf, 55 pages.

Tittel, "An EAZ Way to Restore Crippled and Inoperable Systems," ChannelWeb, Apr. 25, 2005, [Online] [Retrieved on Aug. 13, 2008] Retrieved from the Internet URL: http://www.crn.com/white-box/161502165, 10 pages.

Wang et al., "A Secure and Efficient Desktop Backup and Recovery System", 2007, IEEE, pp. 304-309.

\* cited by examiner

SEARCHING AND RESTORING OF BACKUPS

CROSS REFERENCE TO RELATED APPLICATIONS

This application is a continuation of and claims priority to U.S. patent application Ser. No. 11/760,588, filed on Jun. 8, 2007, the entire contents of which are hereby incorporated by reference.

BACKGROUND

The subject matter of this specification relates generally to storing and restoring digital data.

Modern graphical user interfaces allow a large number of graphical objects or items to be displayed on a display screen at the same time. Operating systems, e.g., Apple Mac OS®, provide user interfaces in which a number of graphical user interface windows can be displayed, overlapped, resized, moved, configured, and reformatted according to the needs of a user or a particular application. Taskbars, menus, virtual buttons, and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save the file's current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file returned to a previous version. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens the document again, it might not be possible to automatically undo any previous edits.

SUMMARY

In general, one aspect of the subject matter described in this specification can be embodied in methods that include the actions of presenting a first search result including a first version of an item, the first version associated with a first date range having a first start date and a first end date; receiving user input requesting that an archive including one or more versions of the item be searched; and presenting a second search result including a second version of the item, the second version different from the first version, the second version associated with a second date range having a second start date and a second end date, and where the second date range does not overlap with the first date range. Other embodiments of this aspect include corresponding systems, apparatus, and computer program products.

In general, another aspect of the subject matter described in this specification can be embodied in methods that include the actions of associating a first archival copy of an item with a first date range, the first date range having a first starting date and a first ending date; detecting that the item is unchanged with respect to the first archival copy; in response to detecting that the item has not changed, extending the first date range; detecting a modification of the item; and associating a second archival copy of the item with a second date range, the second archival copy including the modification to the item, the second date range having a second starting date and a second ending date. Other embodiments of this aspect include corresponding systems, apparatus, and computer program products.

In general, another aspect of the subject matter described in this specification can be embodied in methods that include the actions of presenting a history view including a first search result including a first version of an item, the first version associated with a first date range having a first start date and a first end date; receiving an input in the history view to identify a second version of the item; and presenting a history view including the first search result including the identified second version of the item. Other embodiments of this aspect include corresponding systems, apparatus, and computer program products.

Particular embodiments of the subject matter described in this specification can be implemented to realize one or more of the following advantages. An archival copy of a file is associated with a date range during which the corresponding file outside of the archive has not been modified. When a user browses archival copies of the file, the user can jump from one archival copy directly to another archival copy that includes changes to the file relative to the preceding archival copy.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
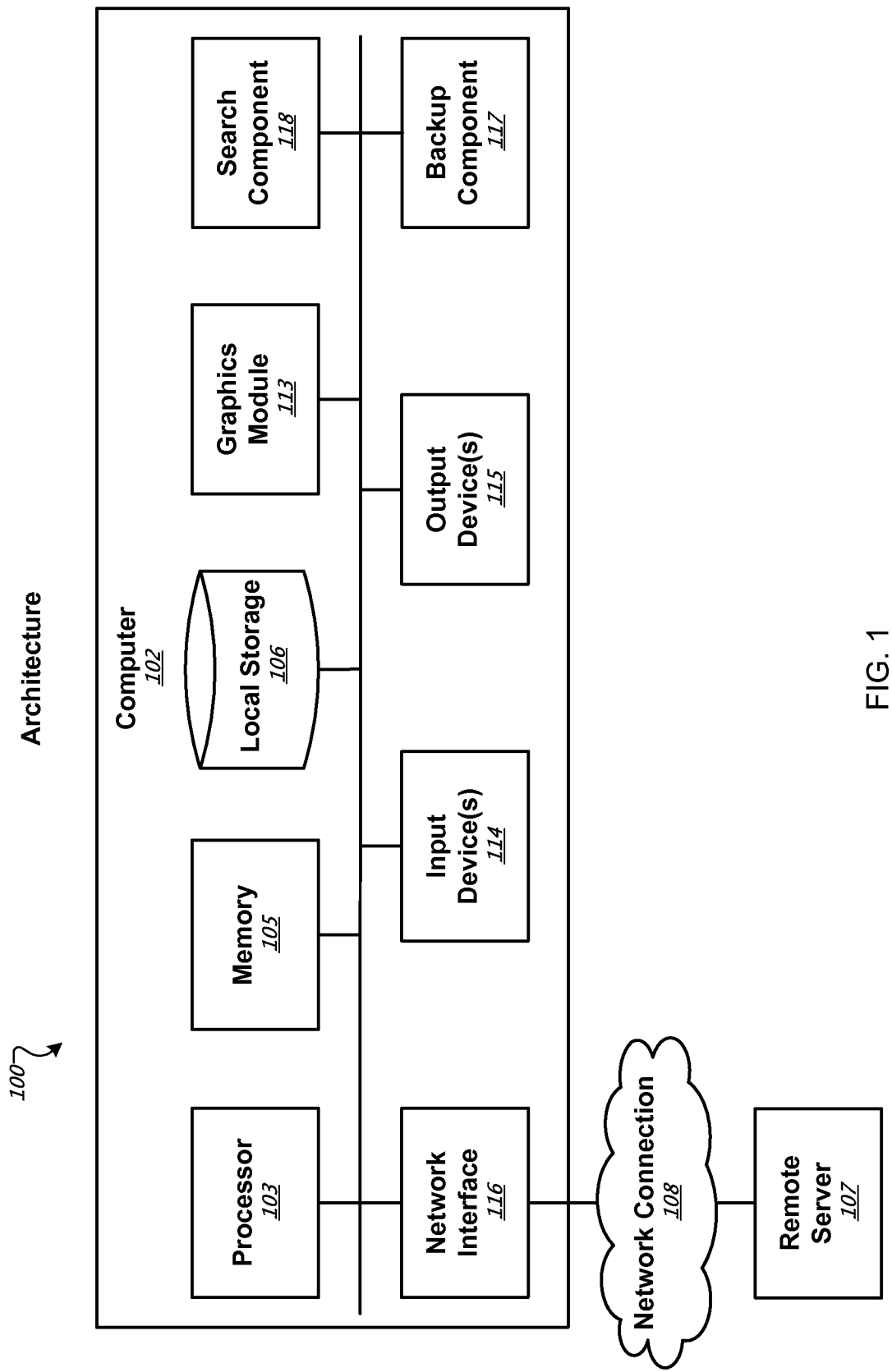
FIG. 1 is a block diagram of an example system.

FIG. 1 is a block diagram of an example system 100. The system 110 can be used for allowing a user to search a captured version of an interface view, perhaps to initiate a restoration based on the captured version. As used herein, a view refers to an item, element, or other content, capable of being stored and/or retrieved in an interface that can be subjected to a backup operation by a backup component 117. For example, a user interface view can contain any number of icons, files, folders, application state information and/or machine state information, preferences, etc.

The system 100 includes a personal computer 102 communicatively coupled to a remote server 107 using a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the system 100 using the input and output devices 114, 115. The system 100 as shown includes various hardware elements. However, the system 100 can include hardware, software, and combinations of the two.

The computer 102 also includes a local storage device 106 and a graphics module 113 (e.g., a graphics card) for storing information and generating graphical objects, respectively. The local storage device 106 can be a computer-readable medium. The computer readable medium can be, for example, a machine-readable storage device, a machine-readable storage substrate, a memory device, a composition of matter effecting a machine-readable propagated signal, or a combination of one or more them.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for searching stored contents that correspond to earlier versions of system information, application information, or system, application, or user interface state. The systems and methods can be stand alone or otherwise integrated into a more comprehensive application. In one implementation, an integrated system and method for modifying a user interface view is disclosed.

Though discussion is made with reference to modifying a interface view (e.g., a user interface view), those of ordinary skill will recognize that such a view can be based on various data structures, files, processes, and other aspects of information management. Thus, a modification to file structures, data and the like is also contemplated in order to achieve the modification to the user interface view. In other words, while the restoration of the user interface view from one state to another can be the most apparent change from the user's perspective, this is accomplished through the corresponding changes in the underlying system content.

One of ordinary skill in the art will recognize that the engines, methods, processes and the like that are described can themselves be an individual process or application, part of an operating system, a plug-in, an application, or the like.

In one implementation, the system and methods can be implemented as one or more plug-ins that are installed and run on the personal computer 102. The plug-ins are configured to interact with an operating system (e.g., MAC OS X, WINDOWS XP, LINUX, etc.) and to perform the various functions, as described with below. A system and method for modifying a user interface view can also be implemented as one or more software applications running on the computer 102. Such a system and method can be characterized as a framework or model that can be implemented on various platforms and/or networks (e.g., client/server networks, wireless networks, standalone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items (e.g., restoring a view including a past state of a file, application, application data, parameters, settings, and the like), for example within the local storage 106 or in an external storage repository. In one implementation, the backup component 117 also allows a user to select any of the stored versions and use the selected version to initiate a restoration of that version in the computer 102.

The computer 102 also includes a search component 118 that allows for searches of the computer's files or other items, for example within the local storage 106 or an external storage repository. In one implementation, the search component 118 can interact with the backup component 117 to perform searches of stored versions of the computer's files and other items. Particularly, in one implementation, the search component 118 allows a user to select search results that have been identified in an earlier version and use the search results to initiate a restoration of that version in the computer 102.

Figure 2:
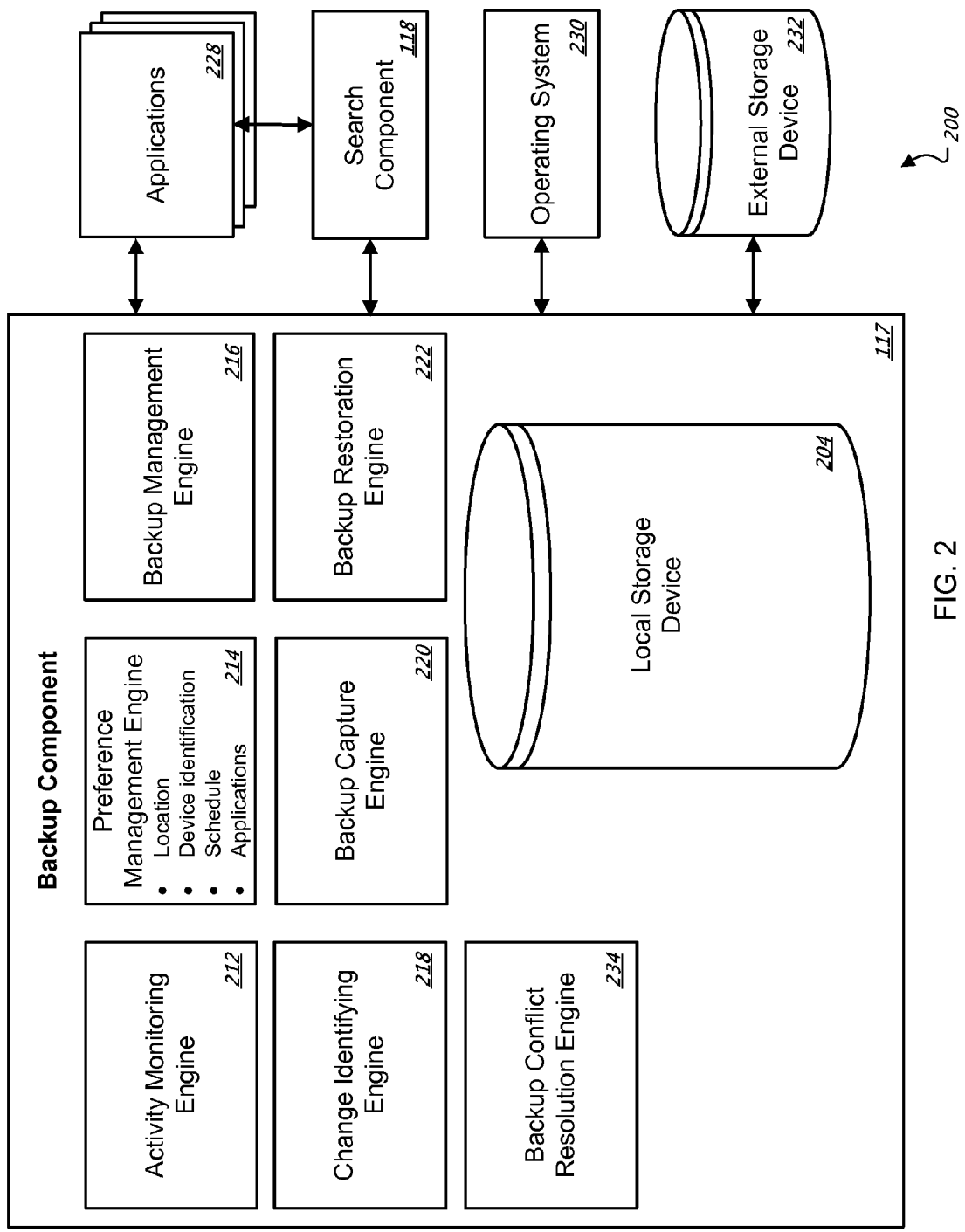
FIG. 2 is a block diagram of an example of architecture for backing up, searching, and restoring system information.

FIG. 2 is a block diagram of an example architecture 200 for backup operations. The architecture 200 can be used to provide backup operations and restoration of backup data including application data (e.g., application files, application data, settings, parameters or the like), associated with a set of applications 228.

In one implementation, the backup component 117 provides back up and restoration capability for the system 100. Many different items or elements can be the subject of a backup operation in the system 100. For example, data elements including folders, files, items, information portions, directories, images, system or application parameters, playlists, address books, e-mails, e-mail folders, a state of an application or state of the system, preferences (e.g., user or system preferences), and the like all can be candidates for inclusion in an archive of backup data during the backup operation. Other types of data can also be included in the backup data for the system 100. In this example, the backup component 117 includes a local storage device 204 and an external storage device 232. Backup data, e.g., particular versions or views resulting from backup operations, can be stored on either or both storage devices. Any number of local and/or external storage devices can be used by the backup component 117 for storing the backup data representing one or more versions of data. In one implementation, no local storage is provided.

In some implementations, for any one element, e.g., item, file, etc., multiple versions can be backed up and stored. In some implementations, for any one element, multiple backup copies can be saved, and any one version of the item, file, element, etc. can be embodied by more than one backup copy (e.g., if the item is backed up periodically and the item remains unchanged over multiple backup intervals).

In one implementation, the backup component 117 runs as a background task on an operating system 230 that is not visible to the user. The backup component 117 can be capable of running across multiple user accounts. In another implementation, the backup component 117 runs within an application in the user space.

The backup component 117 includes an activity monitoring engine 212. In one implementation, the activity monitoring engine 212 monitors for changes within applications (e.g., application files or state) that are targeted for backup operations. A change can include the addition of new files or data (e.g., files or other data structures) or deletion of the same.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through its interaction with the application programs 228. The activity monitoring engine 212 can, for example, create a list of modified elements (e.g., files) to be used when a backup operation is eventually triggered.

In one implementation, the activity monitoring engine 212 can monitor the system for periods of inactivity. The activity monitoring engine 212 can then trigger a backup operation during a period of time in which the backup operation will not cause a system slowdown for an active user.

A preference management engine 214 specifies some operating parameters of the backup component 117. In one implementation, preference management engine 214 contains user-specified and/or system default application parameters for the backup component 117. These can include settings for the details of capturing and storing the views. For example, the preference management engine 214 can determine the frequency of a backup operations, the storage location for the backup data, the types of data elements (e.g., files or other items) that are to be included in the backup operations, and the events which can trigger a backup operation (periodic or event-driven, etc.).

In one implementation, the preference management engine 214 can detect that a new storage device is being added to the system and prompt the user whether it should be included as a backup repository. Files and other items can be scheduled for a backup operation due to location (e.g. everything on the C: drive and within D:/photos), a correlation with specific applications (e.g. all pictures, music, e-mail in an inbox, an address book and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of data (e.g., views) performed by the backup component 117. For example, the backup management engine 216 can trigger the activity monitoring engine 212 to monitor for activities that satisfy a requirement specified in the preference management engine 214.

A change identifying engine 218 locates specific elements (e.g., monitored files or other items) to determine if the elements have changed. The change identifying engine 218 can be capable of discerning a substantive change from a non-substantive change, similar to the example described above for the activity monitoring engine 212. In one implementation, the change identifying engine 218 traverses a target set of elements (e.g., files or other items), comparing a previous version to the current version to determine whether or not a modification has occurred.

A backup capture engine 220 locates views that are to be included in the backup operation. The view (e.g., of an application, file system, etc.) can include various elements (e.g., files, state, and other application information). The backup capture engine 220 can invoke the activity monitoring engine 212 and/or the change identifying engine 218, for example, to generate a capture list identifying data to include in a next backup operation. The backup capture engine 220 can then store data associated with the listed data in one or more targeted storage repositories. For example, the backup capture engine 220 can store the changed elements in a file system hierarchy that includes references (e.g., links) to unchanged elements. The backup capture engine 220 can track multiple version of each view included in the backup repository.

The backup component 117 includes a backup restoration engine 222 to restore previous versions of views (e.g., files, data, or other items). In one implementation, the backup restoration engine 222 provides a user interface (e.g., a graphical user interface) where a user can select a view or portions of a view (e.g., elements, items, etc.) to be restored.

A backup conflict resolution engine 234 can be configured to resolve a conflict that is presented for a particular restoration. For example, the backup conflict resolution engine 234 can detect that the restoration of a particular item to a previous version thereof would result in some portion of information being lost from the current version of the item. In some implementations, the conflict resolution engine 234 can detect this condition, alert the user about it, present one or more possible actions, and receive the user's selection of how to proceed, to name a few examples.

The search component 118 can search directly within the one or more applications 228 for a current state or version of the element including particular files or other items. In addition, the search component 118 can search earlier versions of the files and other items using the backup component 117. For example, the search component 118 can provide a search interface within a backup interface that allows searches of earlier versions of the files or other items. In addition, the search component 118 can provide a search interface within a desktop user interface that allows searches of the current version of the files or other items. Alternatively, in another implementation, the search interface can be presented within the backup interface. Additionally, the search interface can be a component within a single interface, such as a portion of the backup interface and not a separate interface.

For example, the search component 118 can be used to initiate a search to find a particular item or element, such as an image file. If this search finds the sought item, and if the item meets the user's expectations, there may be no need to do any further searching. However, if the search does not find the sought item, or if the item that is found does not meet the user's expectations, the user can choose to perform a search of historical views. The user can activate the backup interface to search the historical views.

Figure 9:
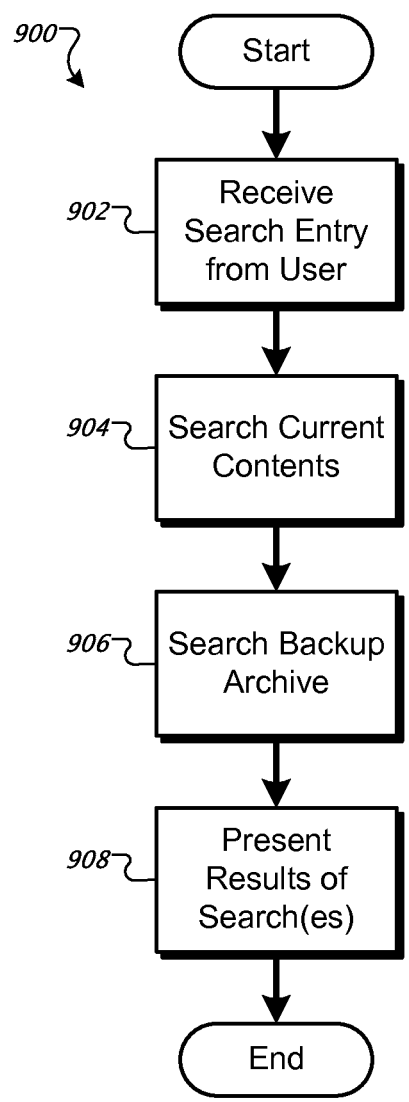
FIG. 9 is a flow chart of an example of a process for searching and restoring system information.

An example of such searching will now be described with reference to FIG. 9. An example process 900 for searching and restoring system information is shown. The process 900 can be performed, for example, by a system such as the system 100 or 200. For clarity of presentation, the description that follows uses the systems 100 and 200 as an example. However, another system, or combination of systems, can be used to perform the process 900.

The system receives (902) a search entry from a user. For example, a user can make a search input using the search component 118. The system searches (904) the current contents based on the search entry. For example, the search component 118 can search data managed by a particular application 228 (e.g., an application that manages the file system). In one implementation, a search application presents a search result to the user from searching the current contents (e.g., a current view). The presented search results can include one or more elements, or items, matching the search entry.

The system searches (906) a backup archive based on the search entry. For example, the search component 118 can use the backup component 117 to access and search historical data (e.g., files, system or application states, or other items). The searching (906) can be performed by default whenever the searching (904) is done. However, in some implementations, the searching (906) is performed upon user initiation. For example, the user can activate the backup component 117 to perform the searching (906).

The system presents (908) results of one or more searches. For example, the search component 118 can present results of a search of the current state of the system 100 within a desktop user interface or results of a search of one or more historical states with a backup interface, or both. For example, in one implementation, one or more history views associated with the current view are presented to the user where each history view includes search results (e.g., visual representations of the search application) based on a search of system data from stored history data e.g., an archive. The search results presented can include one or more items that were not present in the search result provided for the current contents.

In some implementations, both the current contents and the search of the backup archive can always be searched. In certain implementations, the search of the backup archive can be performed automatically upon determining that no results or a non-desired result occurs during the search of the current contents. In certain implementations, the presentation of the results from the current contents search and the backup archive search can occur in separate steps. For example, upon determining that the results of the search of the current contents are not sufficient, a user can initiate a search and presentation of the backup archive.

In some implementations, items in the backup archive are associated with respective date ranges. The date range indicates a time span when the item in the backup archive remained unchanged. For example, if an item in the current contents takes on a particular version and remains unchanged for five days, then a backup version of the item can be associated with a date range spanning the five days. For example, multiple backup operations of the item can occur during that date range. However, with each backup operation the backup component 117 determines that the item is unchanged. A snapshot of the item can be taken during each backup operation, at which time the date range can be updated. As used herein, a snapshot refers to a backup element stored in an archive that includes a backup of selected items or content as specified by the backup component 117. A snapshot can also refer to a view of the current system state with respect to a file, an item, an element, etc.

The date range can be defined by a start date and an end date that specifies when the item became the version associated with the date range and when the item was modified to become a different version. In some implementations, the start date and the end date defining the date range of an item in the backup archive can be included in metadata associated with the item. The association of a date range with an item in the backup archive is described below in relation to FIG. 11.

Figure 10:
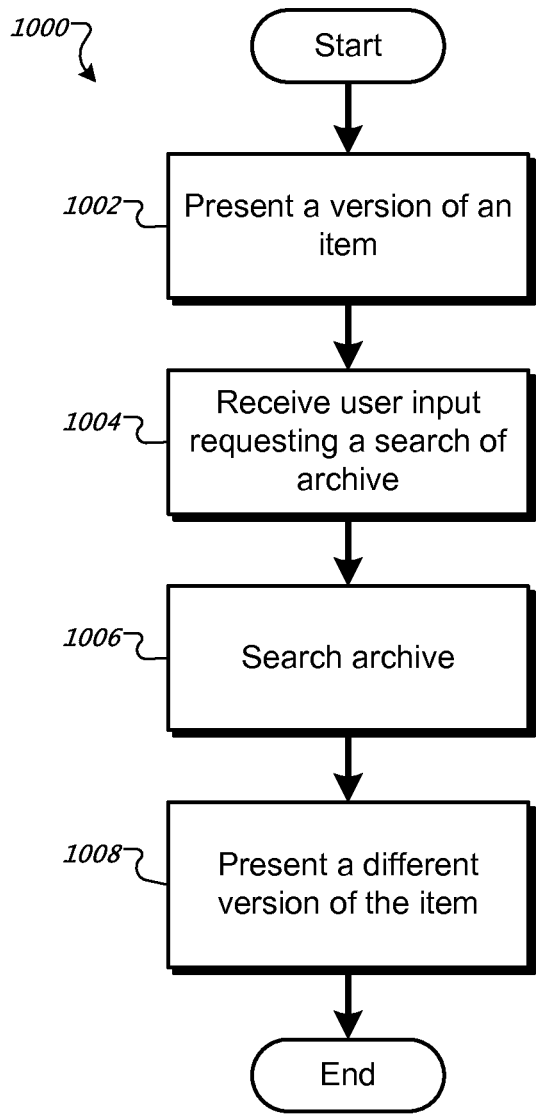
FIG. 10 is a flow chart of an example of a process for searching for items associated with date ranges.

The date ranges associated with current and backup versions of items can be used during a search of the current system state and the backup archive. An example of searching and presenting current and backup content associated with date ranges will now be described with reference to FIG. 10. An example process 1000 for searching system information associated with date ranges is shown. The process 1000 can be performed, for example, by a system such as the system 100 or 200. For clarity of presentation, the description that follows uses the systems 100 and 200 as an example. However, another system, or combination of systems, can be used to perform the process 1000.

The system presents (1002) a version of an item. For convenience, this presented version of the item will be referred to as version X. In some implementations, the presented version X corresponds to a search result of a search performed in accordance with the process 900. For example, a search of the current state of the system and/or the backup archive can be performed and a version (which can be the current version or a version that is stored in the backup archive) of an item can be presented as a search result in a backup interface. The item can be a file, a data entry (e.g., in an address book or a calendar), or any type of data that can be stored in the system. Version X is associated with a date range defined e.g., to include a start date and an end date. The date range indicates the time span when version X was without any substantive modification (e.g., no user edits that result in a substantive change to the data of a file).

The system receives (1004) user input requesting a search of the archive (and optionally the current system state). The input can be a request to search the archive for other backup versions of the item and/or to search the current system state for the current version of the item. In some implementations, the input is a request to navigate, in a backup interface, between search results corresponding to the current system state and one or more backup versions of the item stored in the archive.

For example, if a search result corresponding to the current state is presented in the backup interface, the user can enter an input (e.g., click on a directional arrow) to navigate to a search result corresponding to a previous version in the backup interface (e.g., corresponding to backup data from an earlier backup operation). Likewise, if the search result corresponding to a backup is presented in the backup interface, the user can enter an input to navigate to a search result corresponding to the current state or to an older or newer backup.

The system searches (1006) the archive and/or the current system state. In some implementations, the search is in response to a user input requesting the search, described above in reference to block 1004. The search component 118 can search data in the current file system and use the backup component 117 to access and search data in a backup archive. The search looks for versions of the item that are different from version X. In some implementations, the search looks for versions of the item whose date ranges are outside of the date range of version X. For example, if version X is associated with a date range of Jan. 1, 2005 to Jan. 5, 2005, then the search looks for versions with date ranges that end before or on Jan. 1, 2005 or that begin on or after Jan. 5, 2005 (e.g., snapshots including the item which were taken before or after the date range).

The system presents (1008) another version of the item. For example, the search component 118 can present results of the search performed in accordance with block 1006 in a backup interface. The version that is presented is different from version X, and is associated with a date range that is outside of the date range of the version displayed in block 1002. For example, if version X, presented in the backup interface in accordance with block 1002, is the current version of the item, the version in the archive immediately preceding version X (which is not necessarily the most recent backup copy, as the current version may have been backed up into the backup archive multiple times) can be identified from the backup archive and presented. Thus, a particular version can be valid over a number of backup operations.

The user can navigate between different distinct versions of the item without having to navigate through all backups of the item. The search through the archive uses the date ranges associated with the versions to identify which backups include a distinct version of the item and which backups include the same version of the item as the preceding backup. Consequently, backup data (e.g., particular snapshots including the item) where the version is the same can be skipped when navigating the backup interface.

Figure 11:
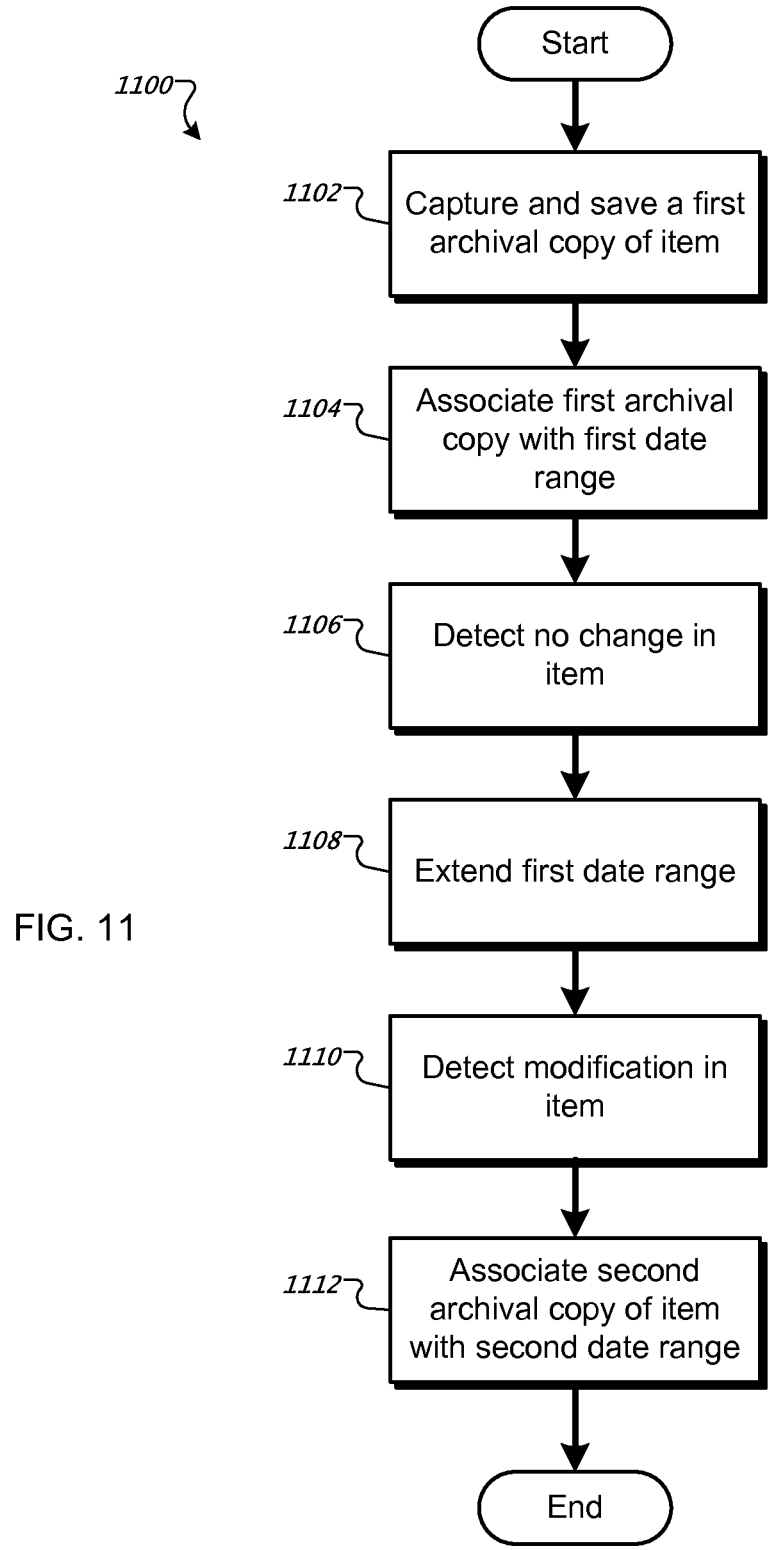
FIG. 11 is a flow chart of an example of a process for associating archival copies of items with date ranges.

An example of associating versions of an item with date ranges will now be described with reference to FIG. 11. An example process 1100 for associating versions of system information with date ranges is shown. The process 1100 can be performed, for example, by a system such as the system 100 or 200. For clarity of presentation, the description that follows uses the systems 100 and 200 as an example. However, another system, or combination of systems, can be used to perform the process 1100.

The system captures and saves (1102) an archival copy of an item. For convenience, this archival copy will be referred to as archival copy A. An archival copy of the item is a backup copy of the item that is captured by the backup capture engine 220 and stored in the archive, for example. The captured and saved archival copy embodies the version of the item that is an unchanged version. In some implantations, the end date is the current date if there is no newer version of the item in the file system. Alternatively, the end date can correspond to the date in which the version was superseded by a new version of the item.

Archival copy A is associated with a date range, defined by a start date and an end date (1104). The start date and end date can be included in metadata associated with archival copy A. In some implementations, the start date of the date range is the date when the version embodied by archival copy A became the current version of the item. For example, the start date can be the date when the version of the item was created (e.g., when the item was created, when the item was modified into the version embodied by the archival copy and saved). In some implementations, the end date is a latest date at which the version embodied by archival copy A is the current version. For example, if archival copy A embodies the current version of the item, then the end date can be the date when archival copy A was captured and saved.

The system detects (1106) that the item is unchanged with respect to archival copy A. In some implementations, the item, in its current version, is compared to archival copy A by the change identifying engine 218. In some implementations, the comparison is performed when another archival copy of the item is to be captured and stored. If the item was not changed substantively since archival copy A, the lack of substantive change is detected by the change identifying engine 218.

The date range associated with archival copy A is extended (1108). In some implementations, the end date of the date range associated with archival copy A is updated to extend the date range. For example, when a new archival copy of an item is captured, and the item has not changed substantively since archival copy A, then the date range of archival copy A is extended (e.g., by changing the end date to the date and time of the new archival copy) to indicate a longer time span during which the version embodied by archival copy A embodies the current version of the item.

The system detects (1110) a modification of the item with respect to the archival copy A. In some implementations, when a new archival copy is captured and saved after the item is changed to a different version, the change identifying engine 218 identifies the change in the item to the new version. For convenience, the new archival copy, embodying a version different from the version embodied by archival copy A, will be referred to as archival copy B.

The system associates (1112) a date range defined by a start date and an end date with archival copy B. The date range associated with archival copy B is different from the date range associated with archival copy A, as archival copy A and archival copy B embody different versions of the item. In some implementations, the start date and the end date of the date range associated with archival copy B is included in metadata associated with archival copy B. The start date of the date range of archival copy B is no earlier than the end date of the date range of archival copy A; the date range during which the version embodied by archival copy B is the current version is later than the date range of the version embodied by archival copy A.

Figure 3:
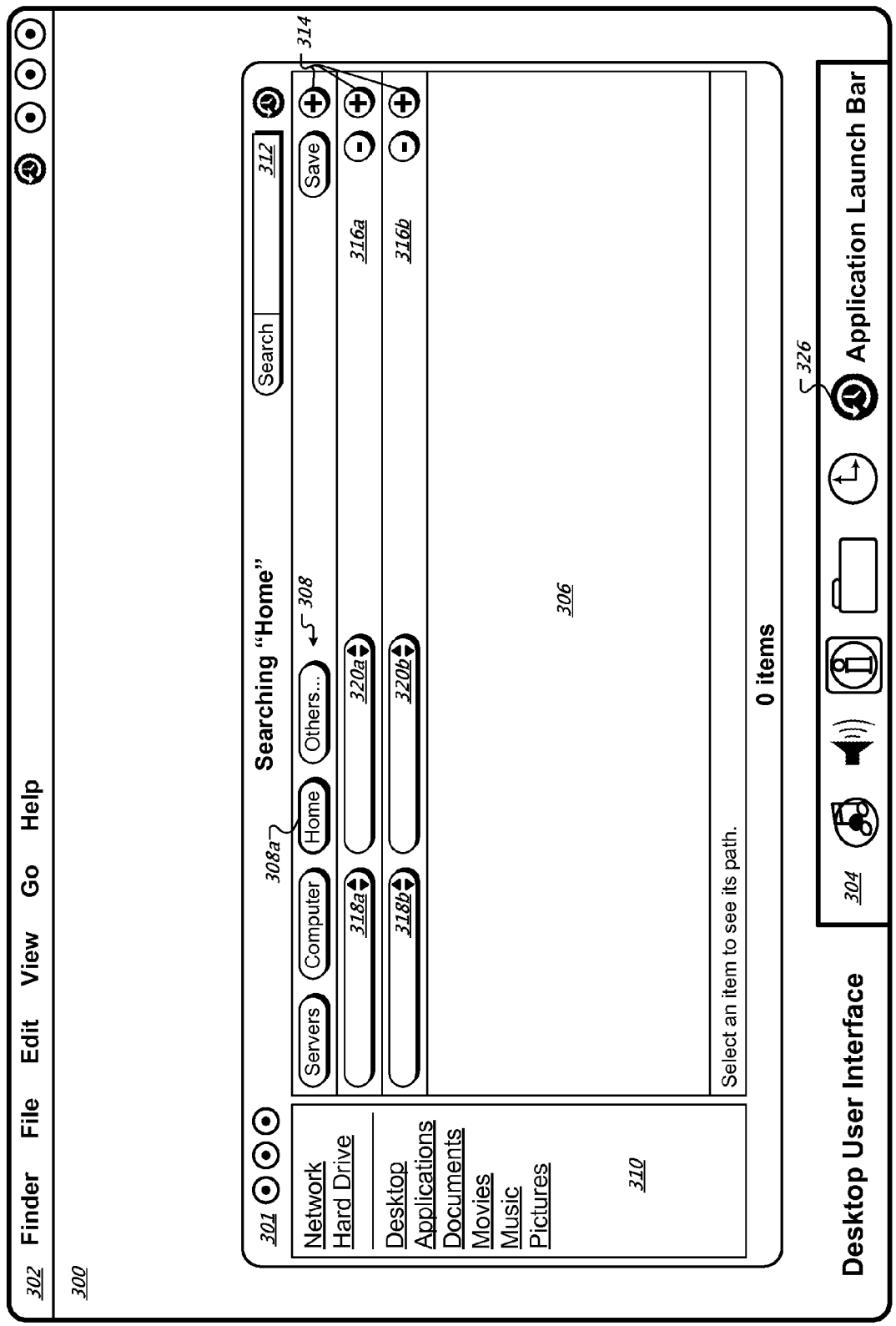
FIG. 3 is a screen shot depicting an example of a desktop user interface including a search application.

FIG. 3 is a screen shot depicting an example of a desktop user interface 300 including a search application 301. In certain implementations, the search component 118 generates the search application 301. The desktop user interface 300 (also referred to herein as "desktop") can be a conventional user interface as can be provided by an operating system. The desktop 300 has a background, a menu bar 302, an application launch bar 304, and can include windows, icons, and other elements. The desktop 300 can have multiple applications running, any or all of which can be presented in a separate window.

The search application 301 allows a user to select one or more search controls and search parameters that specify a search for files or items to be presented in a search results area 306. Search location controls 308 allow a user to select a location, for example within the local storage device 204 or the external storage device 232, where the search will be performed, such as a server, the computer 102, a home folder, or another location. Here, a user has selected a "Home" location control 308a, as indicated at the top of the search application 301. In addition, a navigation area 310 allows a user to navigate to a location within the selected search location. A search phrase control 312 allows a user to input a search phrase to be included in the search. For example, the search application 301 can identify any titles, content, or metadata that contains the search phrase. Search application 301 is only one example search application. In other implementations, other search applications can be used.

The search application 301 allows a user to tailor the search by selecting add controls 314. Here, the search application 301 currently includes two search controls 316a-b. The search controls 316a-b each include a first search parameter 318*a-b*, respectively, and a second search parameter 320*a-b*, respectively. Examples of these search controls will be described below.

In some implementations, the backup component 117 generates a backup interface that can be used for viewing earlier versions of a view that have been included in one or more backup operation (e.g., as stored in an archive), and optionally also for restoring a selected portion of the earlier version of a view. The backup interface can be activated to backup or restore content (e.g., media) or data associated with an application or the system. In one implementation, the user can activate the backup interface from the desktop using a user-selectable backup icon 326 in the application launch bar 304. As another example, a user can activate the backup interface from the menu bar 302. The menu bar 302 can include a backup options menu in addition to the activation selection. The backup options menu can include selections allowing a user to specify data to include in particular backup operations. In other implementations, the user can choose to enter the backup interface directly from an operating system applications menu. In some implementations, the backup component can provide several icons or menus available in other locations within the desktop 300 or running applications, thereby providing several options for activating or otherwise initiating the backup interface.

Figure 4:
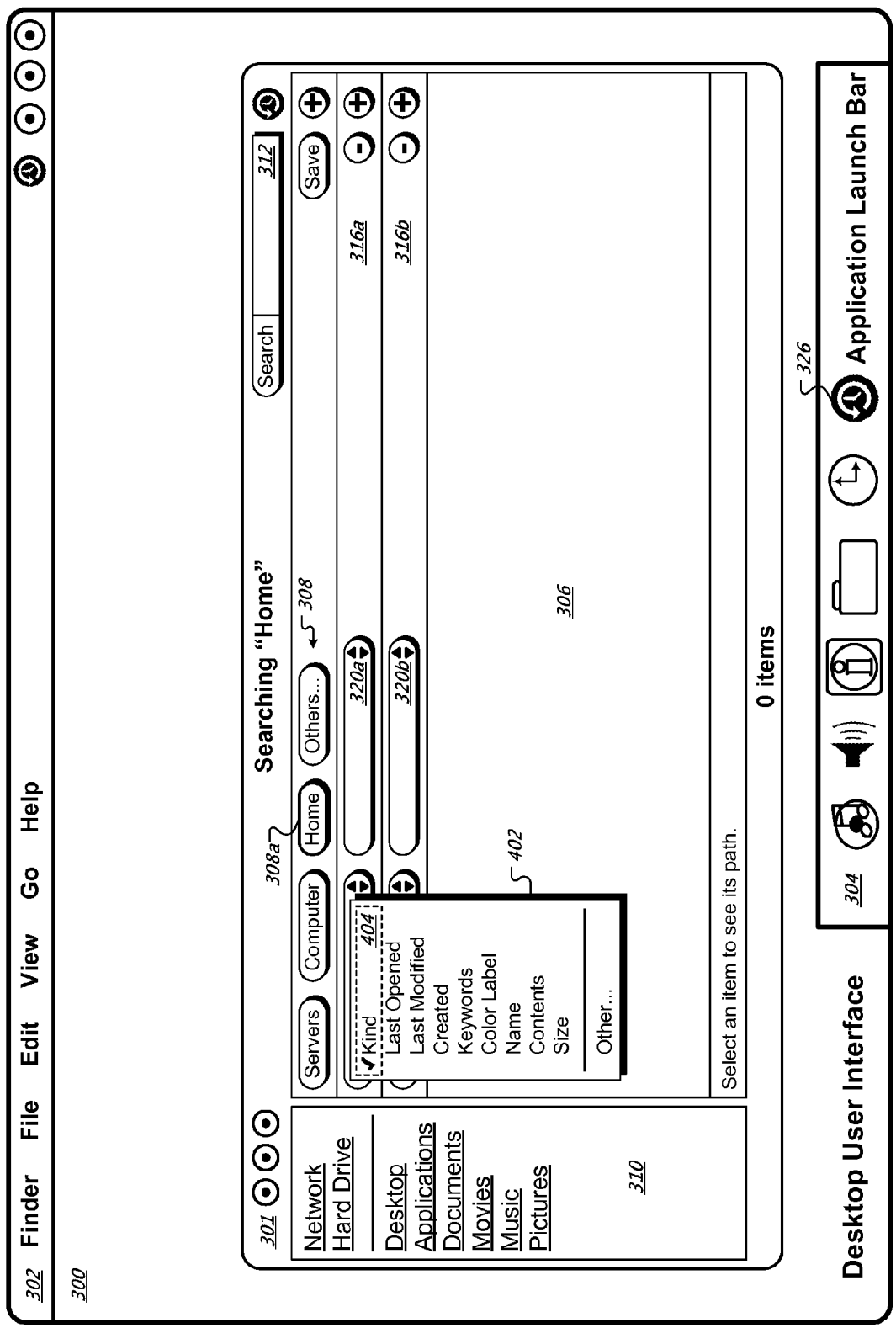
FIG. 4 is a screen shot depicting an example of a desktop user interface including a first list of options within a search application.

FIG. 4 is a screen shot depicting an example of the desktop user interface 300 that presents a list 402 including search parameters for the search application 301. The list 402 shows the possible values for the first search parameter within a search control, in this example the search control 316*a*.

In this example, the list 402 includes the values "Kind," "Last Opened," "Last Modified," "Created," "Keywords," "Color Label," "Name," "Contents," "Size," and "Other." "Kind" allows a user to input a type of items for which to search. "Last opened," "Last Modified," and "Created" allow a user to input dates or time periods about which an item was last opened, modified, or created, respectively. "Keywords" allows a user to select keywords associated with items for which to search. The keywords can be located, for example, in metadata associated with items. "Color label" allows a user to select a color or colors for which to search (e.g., files labeled with a particular color label such as "red" for important files). "Name" allows a user to input the name or part of a name of an item, such as a file name or title. "Contents" allows a user to specify contents to search for, such as a phrase within a text file. "Size" allows a user to input a size or range of sizes of items for which to search. Here, the "Kind" search parameter is selected, as indicated by a dashed line 404.

Figure 5:
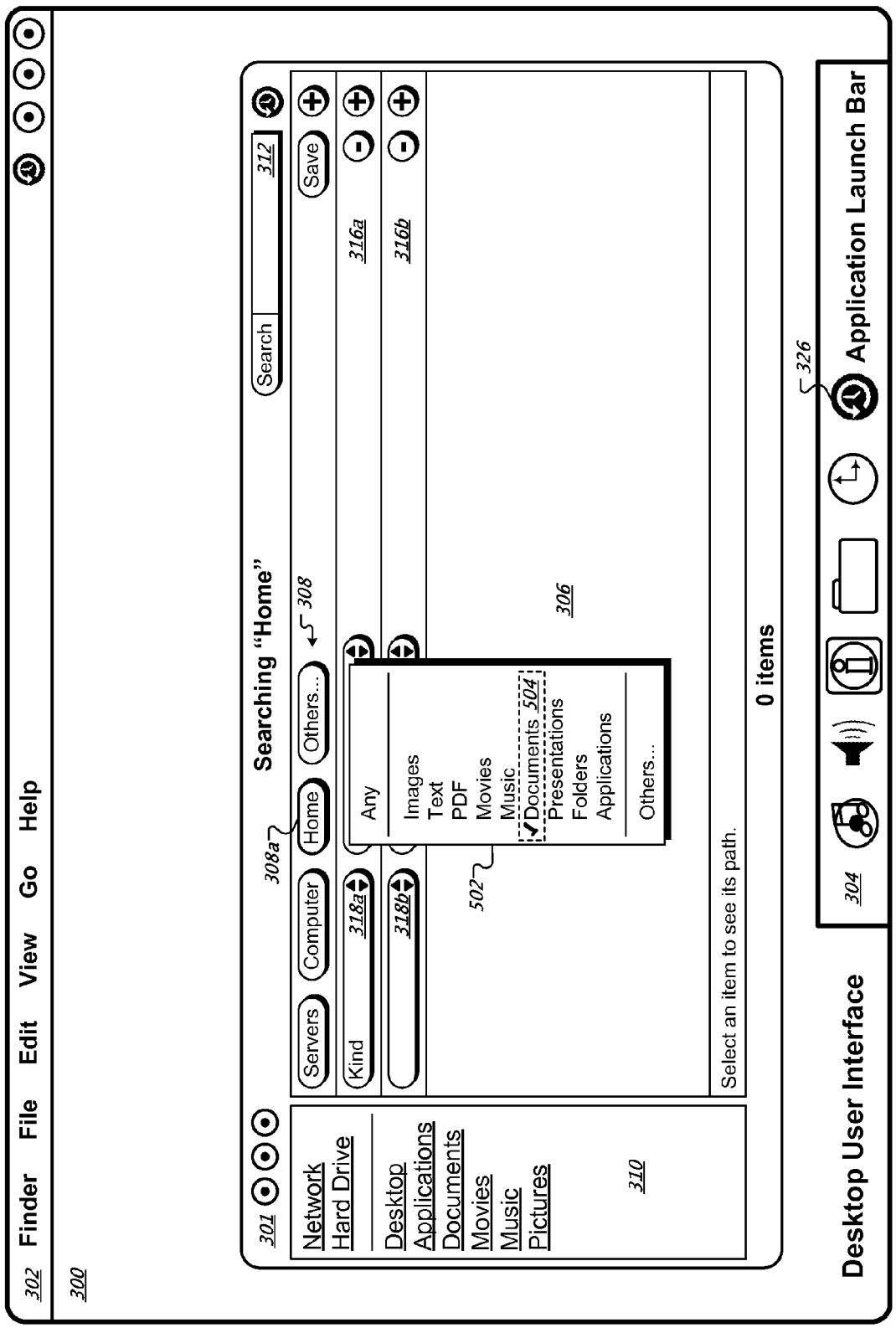
FIG. 5 is a screen shot depicting an example of a desktop user interface including a second list of options within a search application.

FIG. 5 is a screen shot depicting an example of the desktop user interface 300 that presents a list 502 including search parameters for the search application 301. The list 502 shows the possible values for the second search parameter 320*a*. In this example, that search parameter is associated with the "Kind" search parameter that the user has selected. The list 502 includes "Any," "Images," "Text," "PDF" (Portable Document Format), "Movies," "Music," "Documents," "Presentations," "Folders," "Applications," and "Other." The search control 316*a* limits the search to a particular kind of item, in this case, document files. In general, the search application 301 can include any number of search controls. Here, the "Documents" search parameter is selected, as indicated by a dashed line 504. Other search parameters can also be used. Additionally, in one implementation, the search can be part of an application (e.g., part of a word processing application, messaging application, music application, etc.) instead of a particular search application.

Figure 6:
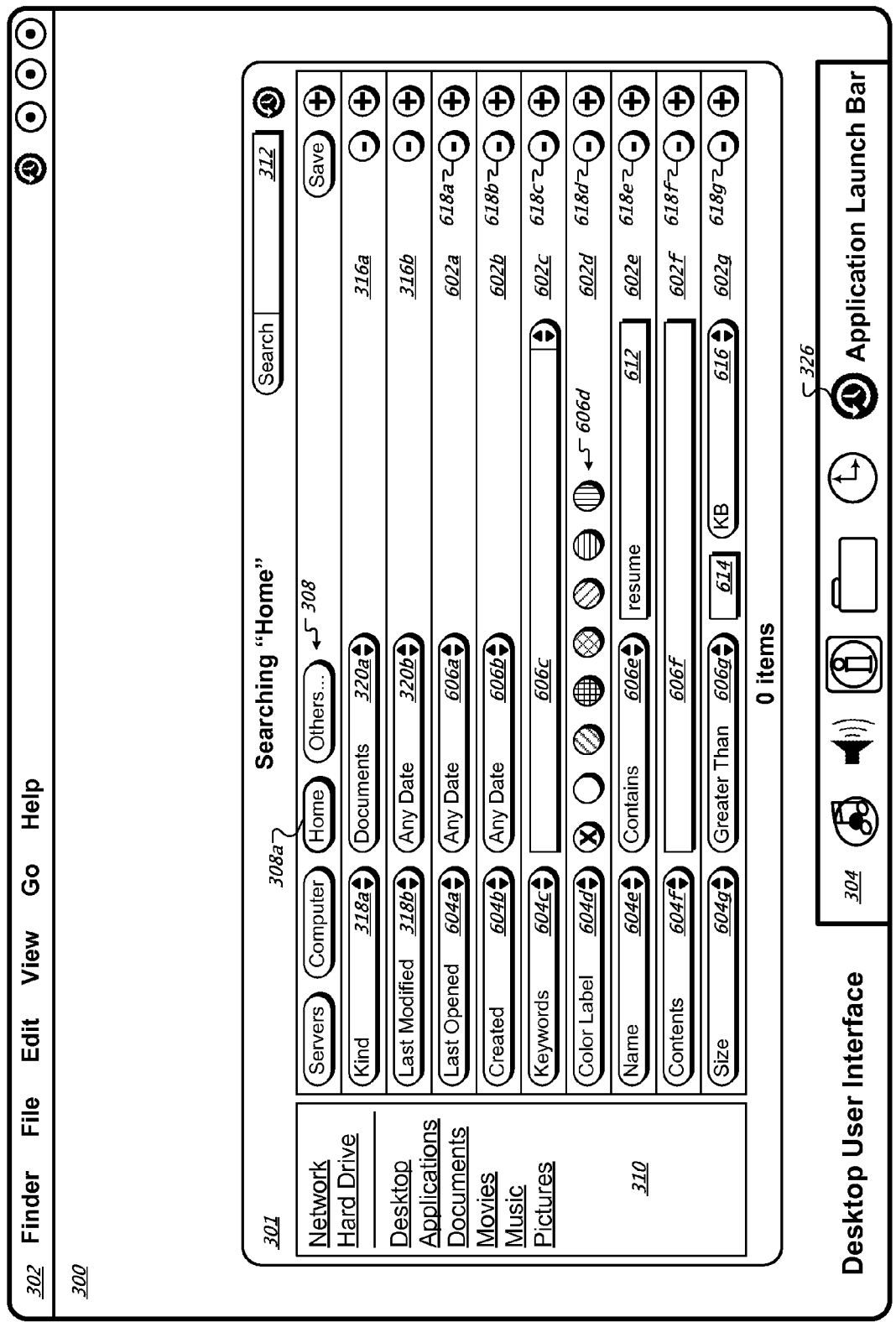
FIG. 6 is a screen shot depicting an example of a desktop user interface including several search inputs within a search application.

FIG. 6 is a screen shot depicting an example of the desktop user interface 300 including several search controls within the search application 301. In addition to the search controls 316*a-b* the search application 301 here includes search controls 602*a-g*. The search controls 602*a-g* have first search parameters 604*a-g*, respectively, and the first search parameters 604*a-g* have associated therewith second search parameters 606*a-g*.

Here, the search parameter 318*b* indicates that the last modified time and/or date is a criterion for the search. The search parameter 320*b* allows a user to select a relationship to the last modified date, such as no limitation with respect to the modified date (e.g., "Any time"), modified dates within a particular time period (e.g., "Within Last") or modified dates before, after, or on a particular date. In some implementations, a time period input control and a time units control allow a user to input a time period length and to select units for the time period, such as seconds, minutes, hours, days, months, or years.

The search parameter 604*a* indicates that the date and/or time that a file or item was last opened is a condition of the search. The associated search parameter 606*a* indicates that an item that was opened on any date satisfies the search condition in the search control 602*a*. Alternatively, the search parameter 606*a* can specify a time period or a particular date in which a file or item was last opened as a condition for the search control 602*a*.

The search parameter 604*b* indicates that the date and/or time that a file or item was created is a condition of the search. The associated search parameter 606*b* indicates that any date satisfies the search condition in the search control 602*b*. Alternatively, the search parameter 606*b* can specify a time period or a particular date in which a file or item was last opened as a condition for the search control 602*b*.

The search parameter 604*c* indicates that keywords associated with a file or item are a condition of the search. For example, the keywords can be contained in metadata associated with image, audio, or video files. The associated search parameter 606*c* allows a user to select a particular keyword from a list of keywords. The selected keyword is the search condition for the search control 602*c*.

The search parameter 604*d* indicates that a color label associated with a file or item is a condition of the search. The associated search parameter 606*d* allows a user to select color labels. The color labels are the search condition for the search control 602*d*.

The search parameter 604*e* indicates that a file or item name is a condition of the search. The associated search parameter 606*e* indicates that the name must contain the text input by the user in search parameter 612 (e.g., "resume"). Alternatively, the search parameter 606*e* can indicate other name conditions, such as matching, beginning with, or ending with the text in the search parameter 612.

The search parameter 604*f* indicates that the contents of a file or item are a condition of the search. The associated search parameter 606*f* allows a user to input text for which to search within the contents of the files or items.

The search parameter 604*g* indicates that the size of a file or item is a condition of the search. The associated search parameter 606*g* indicates that sizes greater than the size input by the user in search parameter 614 and having units as selected in search parameter 616 satisfy the search condition. Alternatively, the search parameter 606*g* can indicate other size conditions, such as an exact size or less than a particular size.

A user can remove search controls by selecting remove controls. For example, a user can remove the search controls 602a-g by selecting remove controls 618a-g, respectively.

In general, a user can trigger the search application 301 to perform searches of the current version of files and items. A user can access earlier versions of the files and items by initiating a backup interface. For example, the user can select the backup icon 326 to initiate the backup interface. Here, the user initiates the backup interface, for example using one of the controls previously mentioned.

Figure 7A:
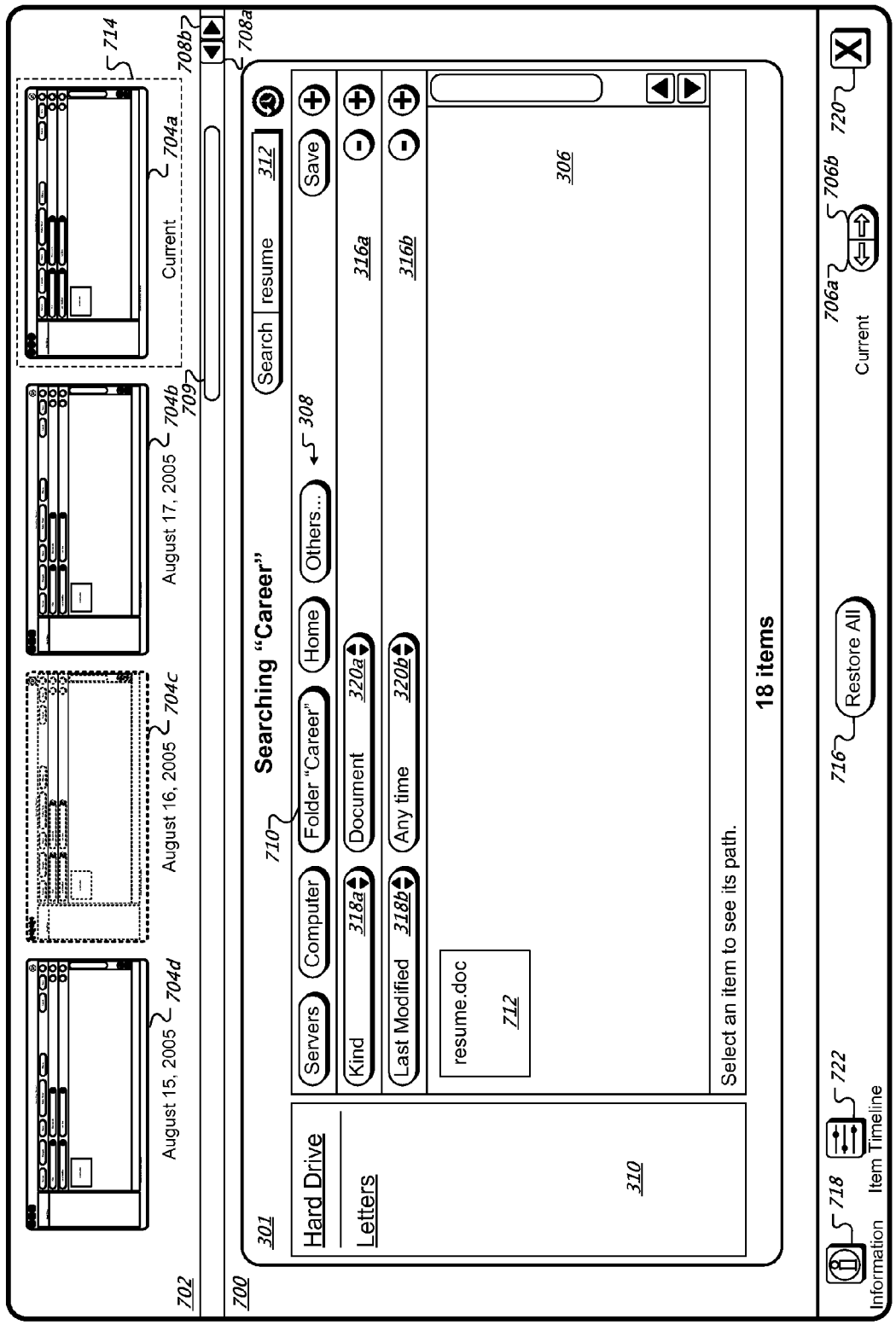
FIGS. 7A-7C is a screen shot depicting an example of a backup interface including search results within a search application.

FIG. 7A is a screen shot depicting an example of a backup interface 700 including search results within the search application 301. In addition to the search application 301, the backup interface 700 includes a timeline 702 and function buttons. In some implementations, the timeline 702 includes snapshots representing the results of performing the current search on an earlier version of system contents that have been backed up. A snapshot refers to a backup element stored in a historical archive that includes a backup of selected items or content as specified by the backup component 117. In this particular example, the timeline 702 presents a date beneath snapshots 704a-d indicating the date of the contents on which that search was performed.

The timeline 702 can include a number of snapshots representing searches performed on current and/or earlier versions or states of the files or items that have been backed up. In one implementation, each snapshot provides a representation of the current or an earlier version of the files or items at a particular point in time that is responsive to the search. In some implementations, the timeline 702 includes a visual representation of the search results screen, such as a miniature version thereof. The timeline 702 can appear across the top portion of the backup interface 700 (as shown). Alternatively, the timeline 702 may not appear in the top portion of the backup interface 700 until a user moves their cursor to (or otherwise activates) the top portion of the interface. In an alternative implementation, in place of the timeline 702, a number of snapshots are presented in a cascading stack. The user can navigate through the stack to snapshots corresponding to particular points in time.

The backup interface 700 can also include function controls. For example, the interface 700 can include arrow buttons 706a and 706b to navigate the snapshots forward or backward. Arrow buttons 708a and 708b and an associated scroll bar 709 can allow the user to navigate to additional snapshots not shown in the current timeline window, thus there can be a large number of snapshots from which to select.

The search application 301 includes the search controls 316a-b as described above with reference to FIG. 6. Here, the search application 301 also includes a search phrase of "resume" in the search phrase control 312. The search location controls 308 include a selected "Career" folder location control 710. The navigation area 310 shows subfolders of the selected "Career" folder. The search application 301 can present search results in the search results area 306 for a search performed using a currently selected snapshot. Here, the search results area 306 presents a list of one or more items 712 satisfying the search conditions (i.e., being in the folder "Career," including the phrase "resume," and being of type "Documents"). These results are represented by a currently selected snapshot 704a, as indicated by dashed line 714. The timeline 702 indicates that these search results are dated for the current time (i.e., the current version of the presented data in the file system). An item 712 can be represented by an identifier, such as a name or an icon, and/or can include a representation of the contents of the item, such as a thumbnail picture. A user can change the search by adding, removing, or modifying search controls.

A restore button 716, when selected, restores the current system state with the files or items in the presented search results. In some implementations, this exits the backup interface 700. A user can select one or more items in the search results and then select the restore button 716 to modify the current version of the item or items selected, if such a version exists, or otherwise to restore the file or item to the current state. For example, the user can select a few images to restore, thereby triggering the restore button to display a more precise message, such as "restore selection only." Restoration of the items results in the retrieval of the item from the archive, and instantiation in the current environment. For example, a file can be retrieved from an archive folder and placed in its current folder, where it is accessible to a user; a system preference (e.g., a time zone or language setting) can be retrieved from an archive and restored as a current system preference that affects the system operation in some regard; or an address book can be restored such that contacts existing in the archived address book are returned to a current address book.

In some implementations, an information button 718 can be included in the backup interface 700. The information button 718 can provide information regarding the selected snapshot. In one implementation, selecting the information button 718 opens a panel display. The panel display provides, in one implementation, information including the date and time the snapshot was made, the location of actual contents in a snapshot, the size of the snapshot, and a comment section.

A close button 720 can be selected to exit the backup engine 700 and return the user to the desktop 300. In some implementations, the backup engine 700 can automatically close upon restoring a particular snapshot. In other implementations, the backup engine 700 can be minimized for purposes of navigating to other applications, such as an email application or a web browser.

In some implementations, the user can select an item timeline icon 722 to open a timeline view of snapshots, which can present text information about one or more snapshots and optionally facilitate navigation to any snapshot. In some implementations, the timeline view can be toggled off and on using the item timeline icon 722. Here, the user initiates the timeline view. Alternatively, in some implementations, a timeline is represented by a series of tick marks in the backup interface (e.g., presented in chronological order). A user can select a particular tick mark in order to move to a snapshot corresponding to that tick mark.

In some implementations, all snapshots that include a particular item or file are shown in the timeline, even if there are consecutive snapshots where the file remained the same version. In one implementation, once an item or file takes on a particular version and that version is captured in a snapshot, then subsequent consecutive snapshots of the same version can be omitted from the timeline 702 or otherwise de-emphasized in the timeline 702 (e.g., by graying out; by displaying in dotted lines, as illustrated by snapshot 704c in contrast to snapshots 704a, 704b, and 704d).

In some implementations, when the user selects the arrow 706a to navigate to an older snapshot, the backup interface navigates to a snapshot whose version of the file or item is different from the version in the snapshot from which the navigation is performed. Vice versa, if the user selects the arrow 706b to navigate to a newer snapshot, the backup interface navigates to a snapshot whose version of the file or item is different from the version in the snapshot from which the navigation is performed. Thus, one or more intermediate snapshots can be skipped when they include a version of the file that is the same as the version in the starting snapshot.

Figure 7B:
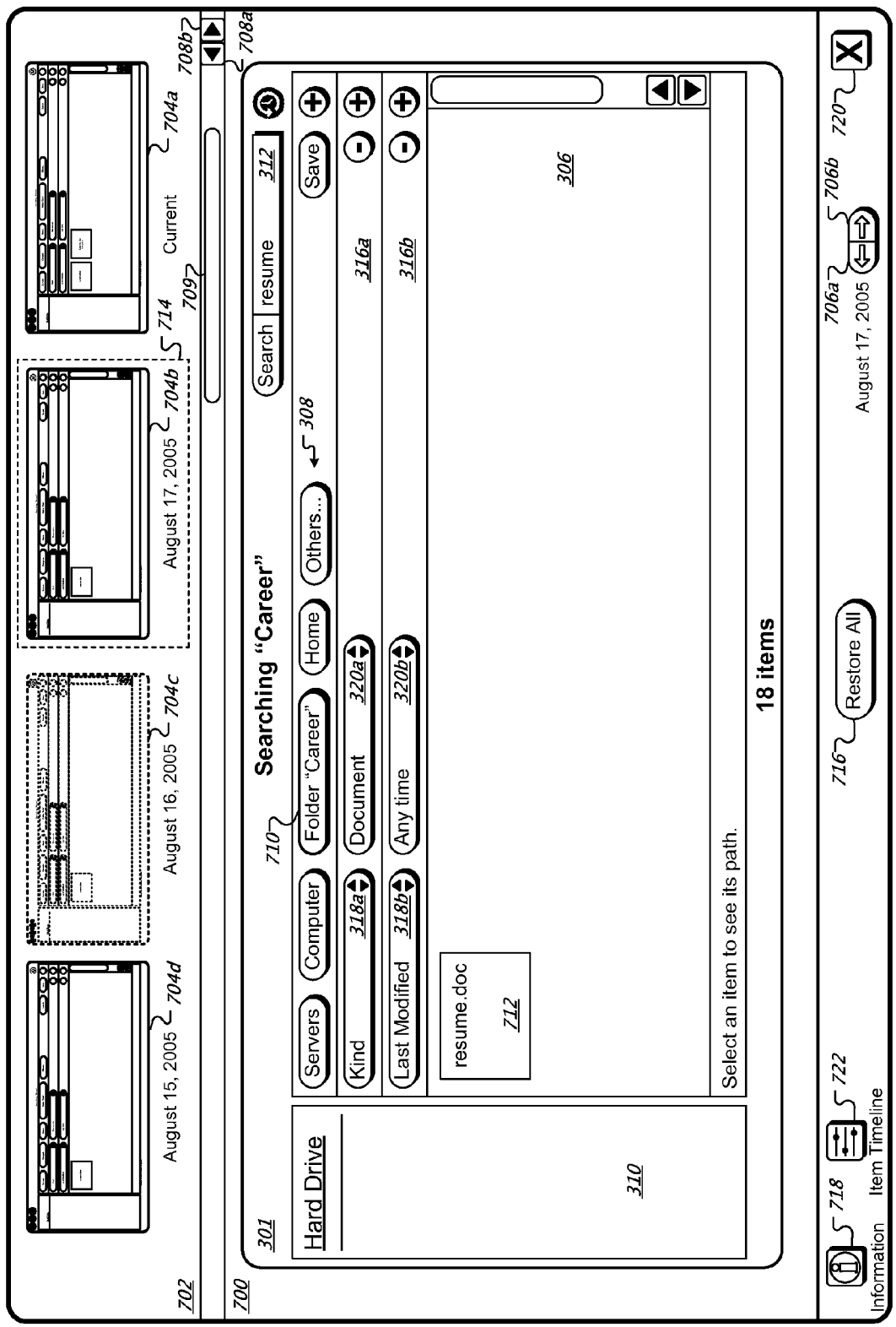
Figure 7C:
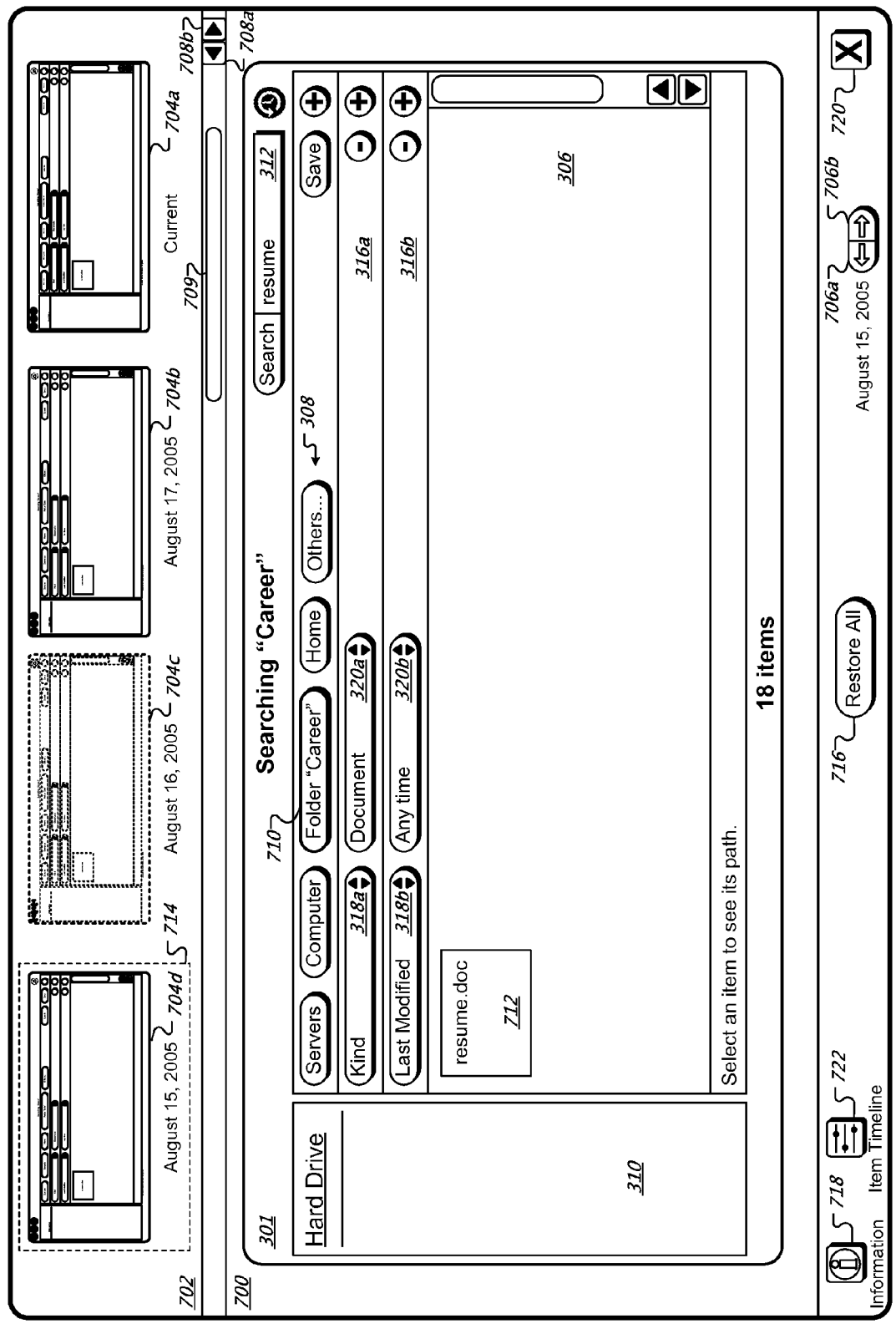

As an example, while the current state snapshot is highlighted, the user selects the arrow 706a while the current state snapshot 704a is currently selected, as shown in FIG. 7A. The backup interface navigates to a snapshot that is older than the currently selected snapshot and whose version of the file is different from the version in the currently selected snapshot, which is snapshot 704b. FIG. 7B shows snapshot 704b being selected, as indicated by dotted line 714. From there, if the user selects arrow 706a again, the backup interface navigates to snapshot 704d, as shown in FIG. 7C. Snapshot 704d includes a version of the file that is different from the version of the file in snapshot 704b. Snapshot 704c is skipped over in the navigation because that snapshot includes the same version as snapshot 704d.

In some implementations, whether a snapshot should be skipped over in the timeline navigation (and whether it should be omitted from the timeline, grayed out, etc.) can be based on date ranges associated with the versions of the file. For example, the version in snapshots 704d and 704c can be associated with the date range of Aug. 15, 2005 to Aug. 16, 2005; the version in snapshot 704b can be associated with the date range of Aug. 17, 2005 to Aug. 17, 2005; and the current snapshot 704a can be associated with the date range of Aug. 18, 2005 to the present date. When arrow 706a or 706b is selected from a particular snapshot, the user interface looks for snapshots having date ranges that are outside of the date range of the particular snapshot. For example, if snapshot 706c is the currently selected snapshot and the use selects arrow 706a to navigate to an older snapshot, the user interface looks for snapshots that are older than Aug. 15, 2005; these older snapshots have date ranges that are outside of the date range associated with the version in snapshots 704d and 704c.

Figure 8:
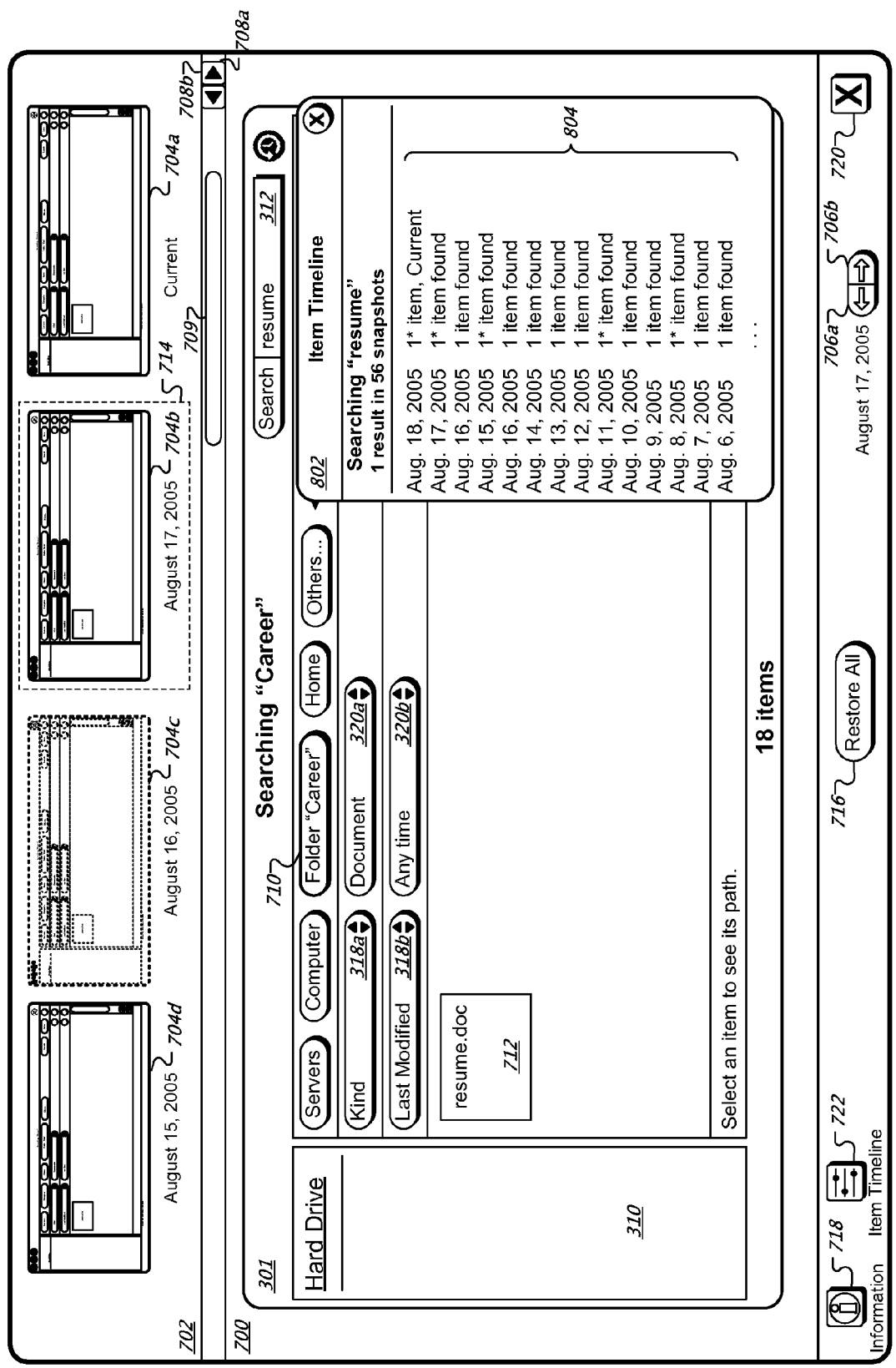
FIG. 8 is a screen shot depicting an example of a backup interface including an item timeline associated with search results within a search application.

FIG. 8 is a screen shot depicting an example of the backup interface 700 including an item timeline 802 associated with search conditions within the search application 301. The item timeline 802 indicates that, for the current search conditions, there is one result in the 56 available snapshots. That is, in this implementation, there are a total of 56 snapshots available that includes one file that matches the current search conditions. The one file can be in different versions throughout the 56 snapshots.

The item timeline 802 presents a list 804 of the resulting snapshots. The list 804 includes the date of the snapshot as well as the number of items in the snapshot that satisfy the search conditions. The item timeline 802 allows a user to see when the responsive contents were captured and how many results exist for each time or date. In other implementations, different information can be presented. For example, snapshots that include a version that is different from the version in the immediately preceding snapshot can be marked by an asterisk. A user can select a snapshot in the list 804 to navigate to that snapshot. The search application 301 then presents, in the search results area 306, a result of the search performed on the corresponding contents. In certain implementations, the item timeline 802 is transparent or semi-transparent allowing windows, applications, or the backup interface 700 to be at least partly visible through the item timeline 802.

In some implementations, the timeline 702 can show only those of the snapshot search results that are different from the current version. That is, the timeline in such an implementation can show all snapshots that match the search, except those whose corresponding earlier state is identical to the current state.

In one example, a user can search for a file in a particular drive of a computer, such as the C: drive. Upon the search not locating the file, the user can initiate the backup engine to view the contents of the drive at various times in the past. After selecting a particular snapshot representing the state of the drive at some point in the past, the results of the search are updated based on the selected snapshot. For example, the results now indicate whether the sought file is in the selected snapshot. If it is there, the user can restore the file from the snapshot search results. In an alternative implementation, when an initial search does not locate the searched for item, the backup engine can be automatically initiated (or a user prompt can be generated to initiate the backup engine). The backup engine can then present snapshots of the search results at different times.

In another example, a user may desire to restore system preference information, such as Internet security settings (e.g., the user may have discovered that the current security conditions are inadequate and wishes to return to a safer security configuration). The user searches for the security setting and then activates the backup. Previous security settings can be presented in the search results as the user selects snapshots representing backed up information for earlier settings. The user can select one or more desired security settings in a particular search result and restore them to the current security settings.

In another example, a user can restore a playlist in iTunes. The user opens the iTunes application and performs a search for a particular playlist. Upon the search results being presented, the user can determine that the current playlist identified in the search contains songs that are too modern for his or her tastes. The user can activate the backup and view the results of performing this search on the backed up contents ranging from the current and to a point of time in the past, say within the last few years. After receiving the search results from the earlier playlist versions, the user can select one of the playlists from the past and restore it to the present state of iTunes.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD ROMs, and magnetic optical disks, read only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
   receiving, in a search interface associated with a search application, a search criterion from a user;
   determining a first search result, wherein determining the first search result comprises searching a current state of a file system based on the search criterion;
   determining one or more historical search results, wherein determining each historical search result comprises searching a different respective prior state of the file system based on the search criterion;
   presenting the first search result in the search interface, the first search result identifying a first version of an item associated with the current state of the file system;

presenting one or more historical representations of the search interface, each historical representation visually depicting the search interface and a respective one of the historical search results, the historical search results identifying one or more historical versions of the item associated with respective prior states of the file system;

receiving a user input selecting a particular historical representation of the search interface and corresponding historical search result;

presenting the selected historical search result in the search interface.

2. The method of claim 1, wherein the search interface comprises one or more graphical search control elements adapted to receive the search criterion from the user.

3. The method of claim 2, wherein each historical representation further visually depicts the one or more graphical search control elements.

4. The method of claim 1, wherein the one or more historical representations are presented as a cascading stack.

5. The method of claim 1, wherein the one or more historical representations of the search interface are presented chronologically according a data range associated with each respective prior state of the file system.

6. The method of claim 5, wherein presenting one or more historical representations of the search interface comprises indicating that a historical version of the item associated with an earlier historical representation is identical to a historical version of the item associated with a later historical representation.

7. The method of claim 6, wherein indicating that the historical version of the item associated with the earlier historical representation is identical to the historical version of the item associated with the later historical representation comprises:

de-emphasizing the later historical representation during presentation.

8. The method of claim 1, wherein the item is a folder, a file, an information portion, a directory, an image, a set of system or application parameters, a playlist, an address book, an e-mail, an e-mail folder, a state of an application or state of a system, a set of preferences, or a combination thereof.

9. The method of claim 1, wherein the each prior state of the file system corresponds to a different non-overlapping date range.

10. The method of claim 1, wherein the historical version of the item is stored with metadata that indicates a date range corresponding to the respective prior state of the file system.

11. A non-transitory computer readable medium storing instructions operable to cause one or more processors to perform operations comprising:

receiving, in a search interface associated with a search application, a search criterion from a user;

determining a first search result, wherein determining the first search result comprises searching a current state of a file system based on the search criterion;

determining one or more historical search results, wherein determining each historical search result comprises searching a different respective prior state of the file system based on the search criterion;

presenting the first search result in the search interface, the first search result identifying a first version of an item associated with the current state of the file system;

presenting one or more historical representations of the search interface, each historical representation visually depicting the search interface and a respective one of the historical search results, the historical search results identifying one or more historical versions of the item associated with respective prior states of the file system;

receiving a user input selecting a particular historical representation of the search interface and corresponding historical search result;

presenting the selected historical search result in the search interface.

12. The non-transitory computer readable medium of claim 11, wherein the search interface comprises one or more graphical search control elements adapted to receive the search criterion from the user.

13. The non-transitory computer readable medium of claim 12, wherein each historical representation further visually depicts the one or more graphical search control elements.

14. The non-transitory computer readable medium of claim 11, wherein the one or more historical representations are presented as a cascading stack.

15. The non-transitory computer readable medium of claim 11, wherein the one or more historical representations of the search interface are presented chronologically according a data range associated with each respective prior state of the file system.

16. The non-transitory computer readable medium of claim 15, wherein presenting one or more historical representations of the search interface comprises indicating that a historical version of the item associated with an earlier historical representation is identical to a historical version of the item associated with a later historical representation.

17. The non-transitory computer readable medium of claim 16, wherein indicating that the historical version of the item associated with the earlier historical representation is identical to the historical version of the item associated with the later historical representation comprises:

de-emphasizing the later historical representation during presentation.

18. The non-transitory computer readable medium of claim 11, wherein the item is a folder, a file, an information portion, a directory, an image, a set of system or application parameters, a playlist, an address book, an e-mail, an e-mail folder, a state of an application or state of a system, a set of preferences, or a combination thereof.

19. The non-transitory computer readable medium of claim 11, wherein the each prior state of the file system corresponds to a different non-overlapping date range.

20. The non-transitory computer readable medium of claim 11, wherein the historical version of the item is stored with metadata that indicates a date range corresponding to the respective prior state of the file system.

21. A system comprising:

one or more processors; and non transitory computer readable medium storing instructions operable to cause one or more processors to perform operations comprising:

receiving, in a search interface associated with a search application, a search criterion from a user;

determining a first search result, wherein determining the first search result comprises searching a current state of a file system based on the search criterion;

determining one or more historical search results, wherein determining each historical search result comprises searching a different respective prior state of the file system based on the search criterion;

presenting the first search result in the search interface, the first search result identifying a first version of an item associated with the current state of the file system;

presenting one or more historical representations of the search interface, each historical representation visually depicting the search interface and a respective one of the historical search results, the historical search results identifying one or more historical versions of the item associated with respective prior states of the file system;

receiving a user input selecting a particular historical representation of the search interface and corresponding historical search result;

presenting the selected historical search result in the search interface.

22. The system of claim 21, wherein the search interface comprises one or more graphical search control elements adapted to receive the search criterion from the user.

23. The system of claim 22, wherein each historical representation further visually depicts the one or more graphical search control elements.

24. The system of claim 21, wherein the one or more historical representations are presented as a cascading stack.

25. The system of claim 21, wherein the one or more historical representations of the search interface are presented chronologically according a data range associated with each respective prior state of the file system.

26. The system of claim 25, wherein presenting one or more historical representations of the search interface comprises indicating that a historical version of the item associated with an earlier historical representation is identical to a historical version of the item associated with a later historical representation.

27. The system of claim 26, wherein indicating that the historical version of the item associated with the earlier historical representation is identical to the historical version of the item associated with the later historical representation comprises:

de-emphasizing the later historical representation during presentation.

28. The system of claim 21, wherein the item is a folder, a file, an information portion, a directory, an image, a set of system or application parameters, a playlist, an address book, an e-mail, an e-mail folder, a state of an application or state of a system, a set of preferences, or a combination thereof.

29. The system of claim 21, wherein the each prior state of the file system corresponds to a different non-overlapping date range.

30. The system of claim 21, wherein the historical version of the item is stored with metadata that indicates a date range corresponding to the respective prior state of the file system.

* * * * *